(12) United States Patent
Taherzadeh Boroujeni et al.

(10) Patent No.: US 11,825,514 B2
(45) Date of Patent: Nov. 21, 2023

(54) REPETITIVE RANDOM ACCESS TRANSMISSIONS

(71) Applicant: QUALCOMM Incorporated, San Diego, CA (US)

(72) Inventors: Mahmoud Taherzadeh Boroujeni, San Diego, CA (US); Tao Luo, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 17/223,383

(22) Filed: Apr. 6, 2021

(65) Prior Publication Data

US 2021/0329692 A1    Oct. 21, 2021

Related U.S. Application Data

(60) Provisional application No. 63/013,136, filed on Apr. 21, 2020.

(51) Int. Cl.
*H04W 74/00* (2009.01)
*H04B 17/318* (2015.01)
(Continued)

(52) U.S. Cl.
CPC ........ *H04W 74/008* (2013.01); *H04B 17/318* (2015.01); *H04L 27/2607* (2013.01);
(Continued)

(58) Field of Classification Search
None
See application file for complete search history.

(56) References Cited

U.S. PATENT DOCUMENTS

| | | | |
|---|---|---|---|
| 2014/0098761 A1* | 4/2014 | Lee | H04W 72/005 370/329 |
| 2016/0007377 A1* | 1/2016 | Frenne | H04W 74/004 370/329 |

(Continued)

OTHER PUBLICATIONS

International Search Report and Written Opinion—PCT/US2021/026273—ISA/EPO—dated Jul. 22, 2021.

*Primary Examiner* — Ajit Patel
*Assistant Examiner* — Liem H. Nguyen
(74) *Attorney, Agent, or Firm* — QUALCOMM Incorporated

(57) ABSTRACT

Methods, systems, and devices for wireless communications are described. A user equipment (UE) may transmit a first random access channel (RACH) message multiple times over corresponding RACH occasions until a second RACH message is received from a base station in a random access response (RAR) window. The multiple times the first RACH message is transmitted may include preamble sequences that are selected from a subset of preamble sequences configured for this repetitive first RACH message transmission scheme. Additionally, a subset of UEs may use this repetitive first RACH message transmission scheme based on a condition of a link between the UE and the base station, an exposure condition of the UE, other measurements, etc. In some cases, a shortened RAR window length may be configured for this repetitive first RACH message transmission scheme.

30 Claims, 19 Drawing Sheets

(51) Int. Cl.
*H04W 24/10* (2009.01)
*H04W 56/00* (2009.01)
*H04W 74/08* (2009.01)
*H04L 27/26* (2006.01)

(52) U.S. Cl.
CPC ......... *H04W 24/10* (2013.01); *H04W 56/001* (2013.01); *H04W 74/0833* (2013.01)

(56) References Cited

U.S. PATENT DOCUMENTS

| | | | |
|---|---|---|---|
| 2017/0279646 A1* | 9/2017 | Yi | H04L 27/2602 |
| 2019/0268947 A1* | 8/2019 | Zhang | H04B 7/088 |
| 2019/0306887 A1* | 10/2019 | Rathonyi | H04W 74/0833 |
| 2019/0320430 A1* | 10/2019 | Kim | H04L 27/2607 |
| 2020/0068616 A1 | 2/2020 | Qian et al. | |
| 2021/0051707 A1* | 2/2021 | Rastegardoost | H04L 5/0051 |
| 2021/0259027 A1* | 8/2021 | Deogun | H04W 72/0446 |
| 2021/0297175 A1* | 9/2021 | Yu | H04J 11/004 |
| 2021/0378031 A1* | 12/2021 | Chai | H04L 5/0044 |
| 2022/0022268 A1* | 1/2022 | Shen | H04W 74/0841 |
| 2022/0046716 A1* | 2/2022 | Chai | H04B 7/088 |
| 2022/0264659 A1* | 8/2022 | Enbuske | H04B 17/318 |
| 2022/0322454 A1* | 10/2022 | Choi | H04W 72/0446 |
| 2023/0007702 A1* | 1/2023 | Park | H04L 5/0094 |

* cited by examiner

REPETITIVE RANDOM ACCESS TRANSMISSIONS

CROSS REFERENCE

The present Application for Patent claims the benefit of U.S. Provisional Patent Application No. 63/013,136 by TAHERZADEH BOROUJENI et al., entitled "REPETITIVE RANDOM ACCESS TRANSMISSIONS," filed Apr. 21, 2020, assigned to the assignee hereof, and expressly incorporated by reference herein.

FIELD OF TECHNOLOGY

The following relates generally to wireless communications and more specifically to repetitive random access transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). When connecting to a base station to receive or transmit subsequent communications, a UE may perform a random access channel (RACH) procedure to establish the connection with the base station.

SUMMARY

The described techniques relate to improved methods, systems, devices, and apparatuses that support repetitive random access transmissions. Generally, the described techniques provide for a user equipment (UE) to transmit a random access request message of a random access channel (RACH) procedure during two or more occasions based on received configuration information for the RACH procedure (e.g., from a base station or other network device). For example, the UE may transmit a first instance of the random access request message during a first occasion, a second instance of the random access request message during a second occasion, etc. Additionally, the UE may use a subset of RACH preambles of a total set of RACH preambles available for the RACH procedure when transmitting the random access request message during the two or more occasions, where the subset of RACH preambles are indicated in the configuration information for the RACH procedure. In some cases, the UE may determine to transmit the random access request message during the two or more occasions based on a power measurement satisfying a threshold value, an exposure condition of the UE, an additional measurement, or a combination thereof. Additionally, the UE may determine a quantity of occasions for transmitting the random access request message based on the configuration information for the RACH procedure.

In some cases, the configuration information for the RACH procedure may also include two or more lengths of time for a random access response (RAR) window (e.g., a time window), where the RAR window is used for communicating to the UE a RAR of the RACH procedure (e.g., in response to the random access request message). For example, a base station may receive the two or more instances of the random access request message during the two or more corresponding occasions and then may determine to transmit the RAR to the UE during an RAR window according to the configuration information. Based on transmitting the random access request message during the two or more occasions, the UE and the base station may use a shortened length of the RAR window compared to a longer RAR window length that is used for a RACH procedure where the UE transmits the random access request message once. Accordingly, using the shortened length of the RAR window, the UE may transmit each instance of the random access request message during an occasion that occurs after the shortened length of the RAR window expires. For example, the UE may transmit the first instance of the random access request message during the first occasion, wait for a time duration equal to the shortened length of the RAR window, then transmit the second instance of the random access request message during the second occasion, wait again for a time duration equal to the shortened length of the RAR window, etc., until a last instance of the random access request message is transmitted during a last occasion, where the UE then monitors for the RAR during a subsequent RAR window that has the shortened length.

A method of wireless communications at a UE is described. The method may include receiving, from a base station, configuration information for performing a random access procedure with the base station for a set of occasions associated with the configuration information; determining to transmit a random access request message of the random access procedure during two or more occasions of the set of occasions based on a condition of a communication link between the UE and the base station; and transmitting a first instance of the random access request message during a first occasion of the set of occasions and a second instance of the random access request message during a second occasion of the set of occasions based on the determining to transmit the random access request message during the two or more occasions of the set of occasions.

An apparatus for wireless communications at a UE is described. The apparatus may include a processor, memory coupled with the processor, and instructions stored in the memory. The instructions may be executable by the processor to cause the apparatus to receive, from a base station, configuration information for performing a random access procedure with the base station for a set of occasions associated with the configuration information; to determine to transmit a random access request message of the random access procedure during two or more occasions of the set of occasions based on a condition of a communication link between the UE and the base station; and to transmit a first instance of the random access request message during a first occasion of the set of occasions and a second instance of the random access request message during a second occasion of the set of occasions based on the determining to transmit the random access request message during the two or more occasions of the set of occasions.

Another apparatus for wireless communications at a UE is described. The apparatus may include means for receiving, from a base station, configuration information for performing a random access procedure with the base station for a set of occasions associated with the configuration information; means for determining to transmit a random access request message of the random access procedure during two or more occasions of the set of occasions based on a condition of a communication link between the UE and the base station; and means for transmitting a first instance of the random access request message during a first occasion of the set of occasions and a second instance of the random access request message during a second occasion of the set of occasions based on the determining to transmit the random access request message during the two or more occasions of the set of occasions.

A non-transitory computer-readable medium storing code for wireless communications at a UE is described. The code may include instructions executable by a processor to receive, from a base station, configuration information for performing a random access procedure with the base station for a set of occasions associated with the configuration information; to determine to transmit a random access request message of the random access procedure during two or more occasions of the set of occasions based on a condition of a communication link between the UE and the base station; and to transmit a first instance of the random access request message during a first occasion of the set of occasions and a second instance of the random access request message during a second occasion of the set of occasions based on the determining to transmit the random access request message during the two or more occasions of the set of occasions.

Some examples of the method, apparatuses, and non-transitory computer-readable medium described herein may further include operations, features, means, or instructions for receiving, from the base station, information indicating a subset of random access preambles associated with transmitting the random access request message for the two or more occasions of the set of occasions, the subset of random access preambles indicated from a set of random access preambles available for the random access procedure, where the determining to transmit the random access request message during the two or more occasions is based on receiving the information.

Some examples of the method, apparatuses, and non-transitory computer-readable medium described herein may further include operations, features, means, or instructions for selecting a random access preamble from the subset of random access preambles, where transmitting the first instance and the second instance of the random access request message during the first occasion and the second occasion includes transmitting the random access preamble.

In some examples of the method, apparatuses, and non-transitory computer-readable medium described herein, a different cyclic shift may be applied to the random access preamble for each instance that the random access request message is transmitted.

Some examples of the method, apparatuses, and non-transitory computer-readable medium described herein may further include operations, features, means, or instructions for selecting a first random access preamble from the subset of random access preambles for the first occasion, where transmitting the first instance of the random access request message during the first occasion includes transmitting the first random access preamble, and selecting a second random access preamble from the subset of random access preambles for the second occasion, where transmitting the second instance of the random access request message during the second occasion includes transmitting the second random access preamble.

Some examples of the method, apparatuses, and non-transitory computer-readable medium described herein may further include operations, features, means, or instructions for performing a power measurement associated with the communication link using the configuration information, and determining the power measurement satisfies a threshold value, where determining to transmit the random access request message during the two or more occasions is based on the power measurement satisfying the threshold value.

In some examples of the method, apparatuses, and non-transitory computer-readable medium described herein, the power measurement may include a reference signal received power (RSRP) measurement, a received signal strength indication (RSSI) measurement, or a combination thereof.

Some examples of the method, apparatuses, and non-transitory computer-readable medium described herein may further include operations, features, means, or instructions for identifying an exposure condition of the UE, where the determining to transmit the random access request message during the two or more occasions is based on the exposure condition of the UE.

Some examples of the method, apparatuses, and non-transitory computer-readable medium described herein may further include operations, features, means, or instructions for receiving, from the base station, information indicating a first length of a time window associated with transmitting the random access request message for the two or more occasions of the set of occasions and a second length of the time window associated with transmitting the random access request message for a single occasion of the set of occasions, the time window used for communicating to the UE a RAR of the random access procedure and the first length being shorter than the second length.

In some examples of the method, apparatuses, and non-transitory computer-readable medium described herein, the first instance of the random access request message may be transmitted before a first time window having the first length, and the second instance of the random access request message may be transmitted after the first time window associated with the first instance expires according to the first length.

Some examples of the method, apparatuses, and non-transitory computer-readable medium described herein may further include operations, features, means, or instructions for monitoring for the RAR of the random access procedure after a last instance of the random access request message is transmitted, where the RAR is monitored during the time window according to the first length.

Some examples of the method, apparatuses, and non-transitory computer-readable medium described herein may further include operations, features, means, or instructions for determining the first length of the time window and the second length of the time window based on a single bitfield in the information, a table of time window lengths, or a combination thereof.

In some examples of the method, apparatuses, and non-transitory computer-readable medium described herein, the first length of the time window may be based on the second length of the time window, a frequency range used for the random access procedure, a frequency band used for the random access procedure, or a combination thereof.

Some examples of the method, apparatuses, and non-transitory computer-readable medium described herein may further include operations, features, means, or instructions for determining a number of occasions for the set of occasions to transmit the random access request message based on the configuration information, where determining to transmit the random access request message during the two or more occasions is based on determining the number of occasions.

In some examples of the method, apparatuses, and non-transitory computer-readable medium described herein, the number of occasions to transmit the random access request message may be based on a bandwidth used for performing the random access procedure, a frequency range used for the random access procedure, a frequency spectrum band used for the random access procedure, or a combination thereof.

In some examples of the method, apparatuses, and non-transitory computer-readable medium described herein, the configuration information may be received via a synchronization signal block (SSB), a system information block (SIB), system information, or a combination thereof.

In some examples of the method, apparatuses, and non-transitory computer-readable medium described herein, the set of occasions may occur between receiving a first SSB carrying the configuration information and receiving a second SSB carrying additional configuration information.

A method of wireless communications at a base station is described. The method may include transmitting, to a UE, configuration information for the UE to perform a random access procedure with the base station for a set of occasions associated with the configuration information; receiving, from the UE, a first instance of a random access request message for the random access procedure during a first occasion of the set of occasions; receiving, from the UE, a second instance of the random access request message for the random access procedure during a second occasion of the set of occasions, the second occasion occurring after the first occasion; and transmitting, to the UE, a RAR of the random access procedure during a time window configured for communicating the RAR, the RAR transmitted based on receiving the first instance and the second instance of the random access request message during two or more occasions of the set of occasions.

An apparatus for wireless communications at a base station is described. The apparatus may include a processor, memory coupled with the processor, and instructions stored in the memory. The instructions may be executable by the processor to cause the apparatus to transmit, to a UE, configuration information for the UE to perform a random access procedure with the base station for a set of occasions associated with the configuration information; to receive, from the UE, a first instance of a random access request message for the random access procedure during a first occasion of the set of occasions; to receive, from the UE, a second instance of the random access request message for the random access procedure during a second occasion of the set of occasions, the second occasion occurring after the first occasion; and to transmit, to the UE, a RAR of the random access procedure during a time window configured for communicating the RAR, the RAR transmitted based on receiving the first instance and the second instance of the random access request message during two or more occasions of the set of occasions.

Another apparatus for wireless communications at a base station is described. The apparatus may include means for transmitting, to a UE, configuration information for the UE to perform a random access procedure with the base station for a set of occasions associated with the configuration information; means for receiving, from the UE, a first instance of a random access request message for the random access procedure during a first occasion of the set of occasions; means for receiving, from the UE, a second instance of the random access request message for the random access procedure during a second occasion of the set of occasions, the second occasion occurring after the first occasion; and means for transmitting, to the UE, a RAR of the random access procedure during a time window configured for communicating the RAR, the RAR transmitted based on receiving the first instance and the second instance of the random access request message during two or more occasions of the set of occasions.

A non-transitory computer-readable medium storing code for wireless communications at a base station is described. The code may include instructions executable by a processor to transmit, to a UE, configuration information for the UE to perform a random access procedure with the base station for a set of occasions associated with the configuration information; to receive, from the UE, a first instance of a random access request message for the random access procedure during a first occasion of the set of occasions; to receive, from the UE, a second instance of the random access request message for the random access procedure during a second occasion of the set of occasions, the second occasion occurring after the first occasion; and to transmit, to the UE, a RAR of the random access procedure during a time window configured for communicating the RAR, the RAR transmitted based on receiving the first instance and the second instance of the random access request message during two or more occasions of the set of occasions.

Some examples of the method, apparatuses, and non-transitory computer-readable medium described herein may further include operations, features, means, or instructions for transmitting, to the UE, information indicating a subset of random access preambles associated with the UE transmitting the random access request message for the two or more occasions of the set of occasions, the subset of random access preambles indicated from a set of random access preambles available for the random access procedure.

In some examples of the method, apparatuses, and non-transitory computer-readable medium described herein, the first instance and the second instance of the random access request message may be received with a same random access preamble or different random access preambles.

In some examples of the method, apparatuses, and non-transitory computer-readable medium described herein, the first instance of the random access request message may be received with a random access preamble with a first cyclic shift applied, and the second instance of the random access request message may be received with the random access preamble with a second cyclic shift applied.

Some examples of the method, apparatuses, and non-transitory computer-readable medium described herein may further include operations, features, means, or instructions for transmitting, to the UE, information indicating a first length of the time window associated with the UE transmitting the random access request message for the two or more occasions of the set of occasions and a second length of the time window associated with the UE transmitting the random access request message for a single occasion of the set of occasions, the first length being shorter than the second length.

Some examples of the method, apparatuses, and non-transitory computer-readable medium described herein may further include operations, features, means, or instructions for determining the first length of the time window based on the second length of the time window, a frequency range used for the random access procedure, a frequency band used for the random access procedure, or a combination thereof.

In some examples of the method, apparatuses, and non-transitory computer-readable medium described herein, the first length of the time window and the second length of the time window may be indicated based on a single bitfield in the signaling, a table of time window lengths, or a combination thereof.

In some examples of the method, apparatuses, and non-transitory computer-readable medium described herein, the second instance of the random access request message may be received after the first instance of the random access request message according to the first length.

Some examples of the method, apparatuses, and non-transitory computer-readable medium described herein may further include operations, features, means, or instructions for determining a number of occasions that the UE is to transmit the random access request message, where the number of occasions is based on a bandwidth used for performing the random access procedure, a frequency range used for the random access procedure, a frequency band used for the random access procedure, or a combination thereof, and transmitting, to the UE, an indication of the number of occasions in the configuration information.

Some examples of the method, apparatuses, and non-transitory computer-readable medium described herein may further include operations, features, means, or instructions for determining the UE is to transmit the random access request message for the two or more occasions of the set of occasions, where the first instance and the second instance of the random access request message may be received based on the determining that the UE is to transmit the random access request message for the two or more occasions of the set of occasions.

In some examples of the method, apparatuses, and non-transitory computer-readable medium described herein, the determining that the UE is to transmit the random access request message for the two or more occasions of the set of occasions may be based on a power measurement, an exposure condition of the UE, or a combination thereof.

Some examples of the method, apparatuses, and non-transitory computer-readable medium described herein may further include operations, features, means, or instructions for selecting a first beam to receive the first instance of the random access request message, and selecting a second beam to receive the second instance of the random access request message, the second beam being different than the first beam.

In some examples of the method, apparatuses, and non-transitory computer-readable medium described herein, the first beam and the second beam may differ based on a beam refinement procedure.

In some examples of the method, apparatuses, and non-transitory computer-readable medium described herein, the configuration information may be transmitted via an SSB, a SIB, system information, or a combination thereof.

In some examples of the method, apparatuses, and non-transitory computer-readable medium described herein, the set of occasions may occur between transmitting a first SSB carrying the configuration information and transmitting a second SSB carrying additional configuration information.

DETAILED DESCRIPTION

Figure 1:
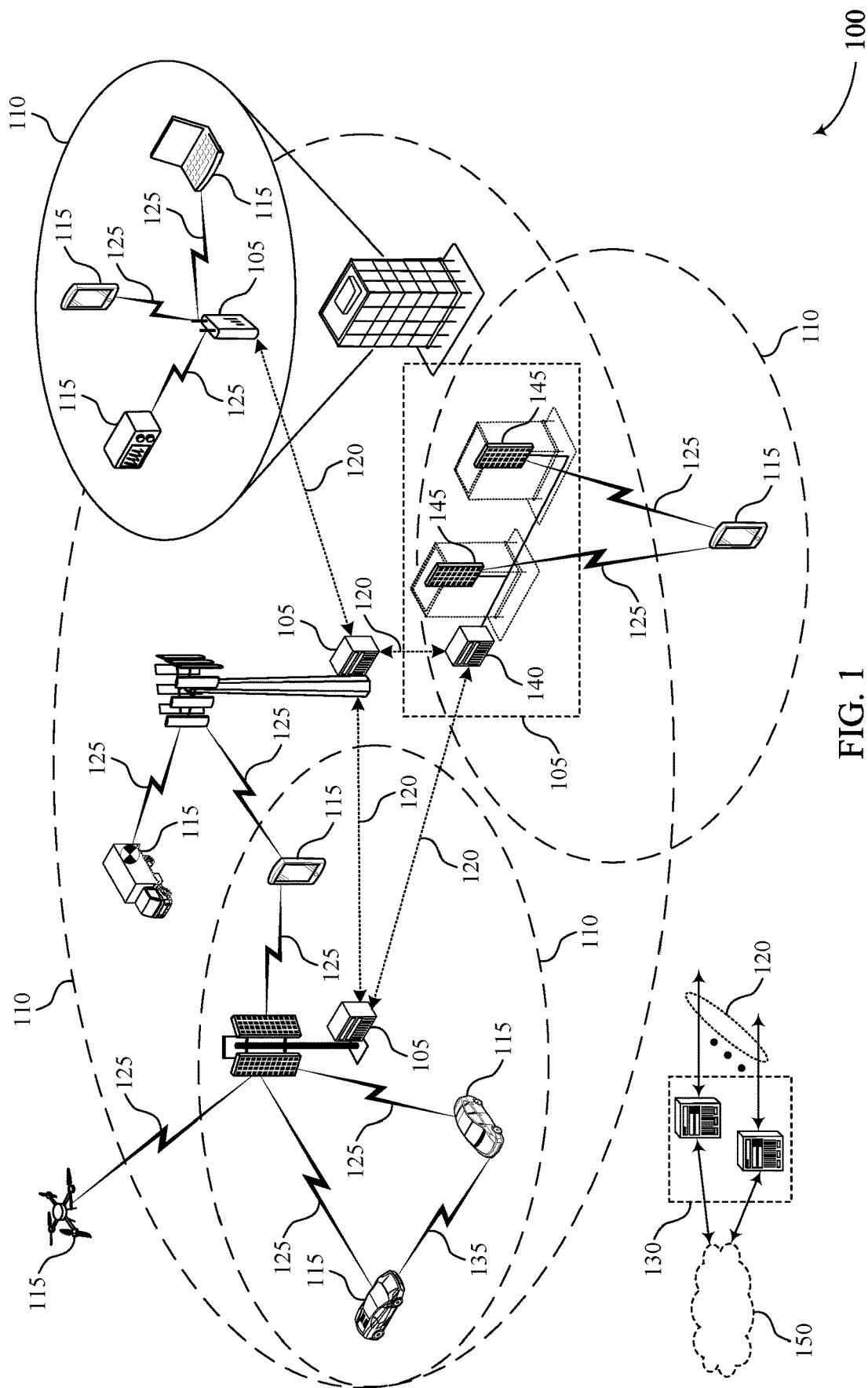
FIG. 1 illustrates an example of a system for wireless communications that supports repetitive random access transmissions in accordance with aspects of the present disclosure.

When establishing a connection between a base station and a user equipment (UE), the UE and the base station may perform a random access channel (RACH) procedure to acquire information for the connection. In some cases, the RACH procedure may involve a two-step RACH procedure or a four-step RACH procedure. In a two-step RACH procedure, two (2) messages are exchanged between the UE and the base station. In a four-step RACH procedure, four (4) messages are exchanged between the UE and the base station. In both types of RACH procedures, the UE may transmit a first RACH message to request the RACH procedure begin. The first message may be referred to as a RACH request message, a random access request message, a RACH preamble, a physical RACH (PRACH) preamble, a msg1, a msgA, etc. However, this first message of the RACH procedure may provide bottlenecks when establishing communications between the UE and the base station based on the base station not successfully receiving the first RACH message, the UE using inefficient transmission parameters for transmitting the first RACH message, or a combination thereof.

Systems, devices, and techniques are described herein where the UE may transmit the first RACH message multiple times using a same preamble sequence or linked preamble sequences over corresponding RACH occasions to improve a reliability of the first RACH message being successfully received at the base station. In some cases, the first RACH message may be transmitted until a second RACH message is received from the base station in a random access response (RAR) window (e.g., after a last occasion that the first RACH message is transmitted). The multiple times the first RACH message is transmitted may include preamble sequences that are selected from a subset of preamble sequences configured for techniques that use this repetitive transmission of the first RACH message. For example, by using a subset of preamble sequences associated with repetitive transmissions of the first RACH message, the base station may have an easier time detecting, receiving, and decoding first RACH messages transmitted multiple times. Additionally, a subset of UEs may use this repetitive first RACH message transmission scheme based on a condition of a link between the UE and the base station. Examples of the conditions of the link may include a power measurement, an exposure condition of the UE, other measurements, etc.

In some cases, a shortened RAR window length may be used when this repetitive first RACH message transmission scheme is used to transmit the first RACH message, as compared to a length of the RAR window for RACH procedures that do not use repetitive RACH transmissions. Additionally, this repetitive first RACH message transmission scheme may be used for a quantity (e.g., a number) of occasions between receiving a first synchronization signal block (SSB) (e.g., a synchronization signal (SS)/physical broadcast channel (PBCH) block) that configures the repetitive first RACH message transmission scheme and receiving a second SSB that configures a different RACH procedure. In some cases, the quantity of occasions that the first RACH message is transmitted may be configured by the base station.

Aspects of the disclosure are initially described in the context of wireless communications systems. Additionally, aspects of the disclosure are illustrated by an additional wireless communications system, a repetitive random access transmission configuration, and a process flow. Aspects of the disclosure are further illustrated by and described with reference to apparatus diagrams, system diagrams, and flowcharts that relate to repetitive random access transmissions.

FIG. 1 illustrates an example of a wireless communications system 100 that supports repetitive random access transmissions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in the central 62 and 72 subcarriers of a carrier, respectively. In some cases, a base station 105 may transmit synchronization signals (e.g., PSS, SSS, and the like) using multiple beams in a beam-sweeping manner through a cell coverage area. In some cases, PSS, SSS, and/or broadcast information (e.g., a PBCH) may be transmitted within different SS blocks (e.g., SSBs) on respective directional beams, where one or more SSBs may be included within an SS burst.

After receiving the PSS and SSS, the UE 115 may receive a master information block (MIB), which may be transmitted in the PBCH. The MIB may contain system bandwidth information, an SFN, and a physical HARQ indicator channel (PHICH) configuration. After decoding the MIB, the UE 115 may receive one or more system information blocks (SIBs). For example, a first SIB (SIB1) may contain cell access parameters and scheduling information for other SIBs. Decoding SIB1 may enable the UE 115 to receive a second SIB (SIB2). SIB2 may contain RRC configuration information related to RACH procedures, paging, physical uplink control channels (PUCCHs), physical uplink shared channels (PUSCHs), power control, sounding reference signals (SRSs), and cell barring.

After completing initial cell synchronization, a UE 115 may decode the MIB, SIB1, and SIB2 prior to accessing the network. The MIB may be transmitted on PBCH and may utilize the first four (4) OFDMA symbols of the second slot of the first subframe of each radio frame. Additionally, the MIB may use a middle 6 RBs (72 subcarriers) in the frequency domain. The MIB may carry a few important pieces of information for UE initial access, including downlink channel bandwidth in term of RBs, PHICH configuration (duration and resource assignment), and SFN. A new MIB may be broadcast every fourth radio frame (SFN mod 4=0) at and rebroadcast every frame (10 ms). Each repetition is scrambled with a different scrambling code.

After reading a MIB (either a new version or a copy), the UE 115 may try different phases of a scrambling code until the UE 115 gets a successful CRC check. The phase of the scrambling code (0, 1, 2 or 3) may enable the UE 115 to identify which of the four repetitions has been received. Thus, the UE 115 may determine the current SFN by reading the SFN in the decoded transmission and adding the scrambling code phase. After receiving the MIB, a UE 115 may receive one or more SIBs. Different SIBs may be defined according to the type of system information conveyed. A new SIB1 may be transmitted in the fifth subframe of every eighth frame (SFN mod 8=0) and rebroadcast every other frame (20 ms). SIB1 may include access information (e.g., initial access related parameters), including cell identity information and may indicate whether a UE 115 is allowed to camp on a cell. SIB1 may also include cell selection information (or cell selection parameters). Additionally, SIB1 may include scheduling information for other SIBs. SIB2 may be scheduled dynamically according to information in SIB1 and may include access information and parameters related to common and shared channels. The periodicity of SIB2 can be set to 8, 16, 32, 64, 128, 256 or 512 radio frames. Based on reading SSBs and the SIB1 (e.g., and subsequent SIB2), the UE 115 may acquire a cell to potentially establish a connection with the cell (e.g., a base station 105).

After the UE 115 decodes SIB2, the UE 115 may transmit a RACH preamble (e.g., a message 1 (Msg1) in a four-step RACH procedure) to a base station 105. For example, the RACH preamble may be randomly selected from a set of 64 predetermined sequences. This random selection may enable the base station 105 to distinguish between multiple UEs 115 trying to access the system simultaneously. The base station 105 may respond with an RAR (e.g., a second message (Msg2)) that provides an uplink resource grant, a timing advance (TA), and a temporary cell radio network temporary identifier (C-RNTI). That is, the base station 105 may detect the Msg1 and then send the Msg2 by transmitting both a physical downlink control channel (PDCCH) and a physical downlink shared channel (PDSCH). For example, the PDCCH may be scrambled with a random access radio network temporary identifier (RA-RNTI) which is a function of a RACH occasion used by the UE 115 to send the Msg1. Within the PDSCH, the base station 105 may include a MAC control element (MAC-CE) to acknowledge the reception of the Msg1 and to grant the UE 115 an uplink grant for sending a third message (Msg3) of the RACH procedure. In some cases, UE 115 may send the Msg1 with power ramping, such that if the Msg2 (e.g., RAR) is not received within a RAR window, the UE 115 can send the Msg1 again with a power boost.

After the base station 105 transmits the Msg2, the UE 115 may monitor the PDCCH for a downlink control information (DCI) message (e.g., DCI 1_0 format) scrambled with an RA-RNTI (e.g., corresponding to the RACH occasion used to transmit the Msg1) and, if detected, may proceed with PDSCH decoding. If a MAC-CE is found in the PDSCH corresponding to the preamble the UE 115 used to send the Msg1, the UE 115 may identify that the MAC-CE is for the UE 115 and may follow the uplink grant (e.g., indicated by the MAC-CE) to send an identifier (ID) for the UE 115 (e.g., UE-ID) in the Msg3 of the RACH procedure. For example, the UE 115 may then transmit an RRC connection request (e.g., the Msg3) along with a temporary mobile subscriber identity (TMSI) (if the UE 115 has previously been connected to the same wireless network) or a random identifier. The RRC connection request may also indicate the reason the UE 115 is connecting to the network (e.g., emergency, signaling, data exchange, etc.). In some cases, the base station 105 may experience a collision from multiple UEs 115 if the multiple UEs 115 used a same preamble sequence in a same RACH occasion for sending a respective Msg1. Additionally, the multiple UEs may also send the Msg3 at a same resource, causing conflict or contention at the base station 105. Accordingly, the base station 105 may respond to the connection request with a contention resolution message (e.g., a fourth message (Msg4)) addressed to the UE 115, which may provide a new C-RNTI. If the UE 115 receives a contention resolution message with the correct identification, the UE 115 may proceed with RRC setup. If the UE 115 does not receive a contention resolution message (e.g., if there is a conflict with another UE 115), the UE 115 may repeat the RACH procedure by transmitting a new RACH preamble. Such exchange of messages between the UE 115 and base station 105 for random access may be referred to as a four-step RACH procedure.

In other examples, a two-step RACH procedure may be performed for random access. For instance, wireless devices operating in licensed or unlicensed spectrum within wireless communications system 100 may initiate a two-step RACH procedure to reduce delays in establishing communications with a base station 105 (e.g., as compared to a four-step RACH procedure). In some cases, the two-step RACH procedure may operate regardless of whether a wireless device (e.g., a UE 115) has a valid TA. For example, a UE 115 may use a valid TA to coordinate the timing of its transmissions to a base station 105 (e.g., to account for propagation delay) and may receive the valid TA as part of the two-step RACH procedure. Additionally, the two-step RACH procedure may be applicable to any cell size, may work regardless of whether the RACH procedure is contention-based or contention-free, and may combine multiple RACH messages from a four-step RACH procedure. For example, the two-step RACH procedure may include a first message (e.g., a message A (MsgA)) that combines the Msg1 and Msg3 of the four-step RACH procedure and a second message (e.g., a message B (MsgB)) that combines the Msg2 and Msg4 of the four-step RACH procedure.

The two-step RACH procedure may be applicable to any cell size supported in a wireless communications system, may be able to operate regardless of if a UE 115 has a valid TA or not, and may be applied to any RRC state of the UE 115 (e.g., an idle state (RRC_IDLE), an inactive state (RRC_INACTIVE), a connected state (RRC_CONNECTED), etc.). In some cases, the two-step RACH procedure may result in a reduction in signaling overhead and latency, an enhanced RACH capacity, power savings for the UE 115, and provide synergy with other applications (e.g., positioning, mobility enhancement, etc.).

In some network deployment scenarios (e.g., for NR), two-step RACH procedures and four-step RACH procedures may be used simultaneously to meet different conditions for the system. For example, the different conditions may include capacity conditions, latency conditions, reliability conditions, implementation complexity specifications, etc. Accordingly, different transmission occasions may be defined that can be used for both or either RACH procedure. For example, the different transmission occasions may include RACH occasions and uplink shared channel occasions (e.g., PUSCH occasions). The RACH occasions may include time and frequency resources allocated for physical RACH (PRACH) transmissions. Additionally, up to 64 preamble sequences may be configured for each RACH occasion. In some cases, a two-step RACH procedure may use RACH occasions separate from a four-step RACH procedure or may share RACH occasions with a four-step RACH procedure but use different sets of preamble sequences. Additionally or alternatively, the uplink shared channel occasions (e.g., PUSCH occasions) may include time and frequency resources allocated for MsgA PUSCH transmissions (e.g., for transmissions associated with the four-step RACH procedure).

In some cases, the first message of a RACH procedure (e.g., the Msg1, Msg2, RACH preamble, PRACH, PRACH preamble, etc.) may provide bottlenecks (e.g., slowdowns, increases in latency, delays, etc.) when establishing communications based on a base station 105 not successfully receiving the first RACH message, a UE 115 using inefficient transmission parameters for transmitting the first RACH message, or a combination thereof. In some cases, to mitigate the bottlenecks, the UE 115 may use PRACH repetition or may use different PRACH formats for the first RACH message to increase the PRACH coverage or both. Additionally, the base station 105 may use beam refinement to enhance the coverage of transmission of a PDCCH as part of a second message transmission of the RACH procedure (e.g., Msg2, MsgB, RAR, etc.) and for later messages. However, using these PRACH enhancements or other enhancements may increase the usage of PRACH resources and may waste PRACH resources for UEs 115 where the enhancements may be unnecessary. Accordingly, techniques are desired to improve coverage of first RACH messages and PRACHs (e.g., and RACH procedures in general) without an excessive increase in usage of PRACH resources.

Wireless communications system 100 may support efficient techniques for a UE 115 to transmit the first RACH message multiple times using a same preamble sequence or linked preamble sequences over corresponding RACH occasions until a second RACH message (e.g., a RACH response) is received from a base station 105 in an RAR window. When transmitting the first RACH message the multiple times, the multiple instances of the first RACH message may include preamble sequences that are selected from a subset of preamble sequences configured for this repetitive first RACH message transmission scheme. For example, by using a subset of preamble sequences, the base station 105 may have an easier time detecting, receiving, and decoding first RACH messages transmitted the multiple times. Additionally, a subset of UEs may use this repetitive first RACH message transmission scheme based on a condition of a link between the UE and the base station (e.g., a power measurement), an exposure condition of the UE, other measurements, etc. This repetitive first RACH message transmission scheme may be used for a number of occasions between receiving a first SSB that configures the repetitive first RACH message transmission scheme and receiving a second SSB that configures a different RACH procedure. In some cases, the number of occasions that the first RACH message is transmitted may be configured by the base station 105.

Figure 2:
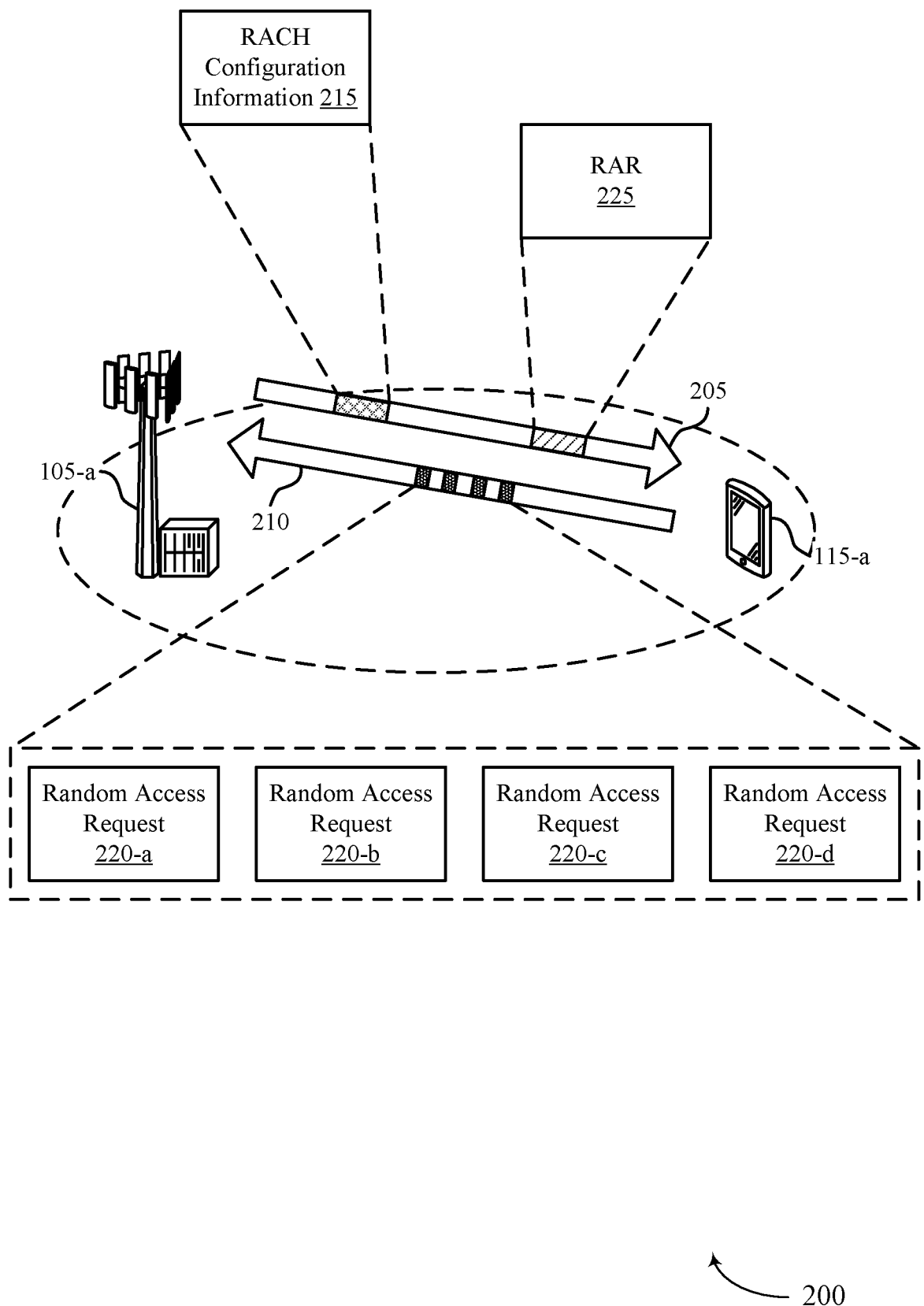
FIG. 2 illustrates an example of a wireless communications system that supports repetitive random access transmissions in accordance with aspects of the present disclosure.

FIG. 2 illustrates an example of a wireless communications system 200 that supports repetitive random access transmissions in accordance with aspects of the present disclosure. In some examples, wireless communications system 200 may implement aspects of or may be implemented by aspects of wireless communications system 100. For example, wireless communications system 200 may include a base station 105-a and a UE 115-a, which may be examples of corresponding base stations 105 and UEs 115, respectively, as described with reference to FIG. 1. In some cases, UE 115-a may attempt to establish a connection with base station 105-a using a RACH procedure, such as a four-step RACH procedure or a two-step RACH procedure as described with reference to FIG. 1. As part of the RACH procedure, base station 105-a may transmit one or more downlink messages to UE 115-a on resources of a downlink carrier 205, and UE 115-a may transmit one or more uplink messages to base station 105-a on resources of an uplink carrier 210. While shown as separate carriers, downlink carrier 205 and uplink carrier 210 may be a single carrier.

Prior to performing the RACH procedure, base station 105-a may transmit RACH configuration information 215 on the downlink carrier 205. In some cases, base station 105-a may transmit the RACH configuration information 215 as part of an SSB, a SIB (e.g., SIB1), remaining minimum system information (RMSI), additional system information (SI) messages, etc. Additionally, the RACH configuration information 215 may include configurations for UE 115-a for performing the RACH procedure for multiple occasions (e.g., RACH occasions). For example, as described herein, the RACH configuration information 215 may include information to enable UE 115-a to transmit a random access request message 220 (e.g., a first message of the RACH procedure, a Msg1, a MsgA, PRACH message, etc.) on the uplink carrier 210 during two or more occasions of the multiple occasions.

In some cases, UE 115-a may determine a quantity (e.g., a number) of occasions of the multiple occasions for transmitting the random access request message 220 from the RACH configuration information 215. For example, base station 105-a may determine a limit on a quantity of repetitions for UE 115-a to transmit the random access request message 220 (e.g., the number of occasions) based on a bandwidth used for the RACH procedure, a frequency range used for the RACH procedure, a frequency spectrum used for the RACH procedure, or a combination thereof. Subsequently, base station 105-a may indicate this limit to UE 115-a in the RACH configuration information 215. Additionally or alternatively, UE 115-a may determine the quantity of occasions to transmit the random access request message 220 based on a pre-configuration for UE 115-a (e.g., loaded into UE 115-a).

Additionally, the RACH configuration information 215 may include an indication of a subset of RACH preambles that UE 115-a can use when transmitting the random access request message 220 the multiple times (e.g., random access request message 220 repetitions). For example, the subset of RACH preambles may include a portion of a total set of RACH preambles available for use in the RACH procedure (e.g., up to 64 preamble sequences may be configured for use in a RACH procedure). The subset of the RACH preambles may be associated with repetitive transmission of the first RACH message. By using the subset of RACH preambles, base station 105-a may be configured to detect, combine, and decode the random access request message 220 transmitted during the two or more occasions (e.g., the subset of RACH preambles may reduce complexity of PRACH detection at base station 105-a).

Prior to transmitting the random access request message 220 for the two or more occasions, UE 115-a may first determine whether to transmit the random access request message 220 for the two or more occasions. For example, not all UEs 115 attempting a RACH procedure may transmit the random access request message 220 during or using more than one occasion. Accordingly, a subset of UEs 115 may transmit the random access request message 220 for two or more occasions as part of a RACH procedure. UE 115-a may determine whether UE 115-a is part of this subset of UEs 115 based on a power measurement, an exposure condition (e.g., a maximum permissible exposure (MPE)) of UE 115-a, other measurements, or a combination thereof.

For example, UE 115-a may perform a power measurement (e.g., a reference signal received power (RSRP) measurement, a received signal strength indication (RSSI) measurement, a signal-to-noise ratio (SNR), a signal-to-interference-plus-noise ratio (SINR), etc.) on a synchronization signal received from base station 105-a (e.g., SSB, PSS, SSS, SIB, etc.), and if the power measurement satisfies a threshold value (e.g., the power measurement is above or below a threshold value), UE 115-a may determine to transmit the random access request message 220 for the two or more occasions. That is, if UE 115-a is far away from base station 105-a (e.g., or other factors that cause power degradation, such as interferences), the power of the reference signals may be low at UE 115-a, and, as such, UE 115-*a* may infer that uplink transmissions (e.g., including the Msg1 and random access request message 220 transmissions) may also experience low power reception at base station 105-*a*. Accordingly, by transmitting the random access request message 220 for the two or more occasions, UE 115-*a* may increase the likelihood that the random access request message 220 is successfully received and decoded by base station 105-*a* to advance the RACH procedure rather than reattempting a random access request message transmission and restarting the RACH procedure.

After determining to transmit the random access request message 220 for the two or more occasions, UE 115-*a* may transmit the random access request message 220 for the two or more occasions (e.g., repetitive PRACH transmissions) using a same RACH preamble sequence or linked RACH preamble sequences over corresponding RACH occasions until a RAR (e.g., Msg2, MsgB, etc.) is received in a RAR window from base station 105-*a* (e.g., after a last repetition). Accordingly, UE 115-*a* may select the same RACH preamble or linked RACH preamble sequences for transmitting the random access request message 220 during the two or more occasions from the subset of RACH preambles indicated to UE 115-*a* in the RACH configuration information 215 that can be used for transmitting the random access request message 220 repetitions.

As shown, UE 115-*a* may transmit a first random access request message 220-*a* (e.g., a first instance) during a first occasion, a second random access request message 220-*b* (e.g., a second instance) during a second occasion, a third random access request message 220-*c* (e.g., a third instance) during a third occasion, and a fourth random access request message 220-*d* (e.g., a fourth instance) during a fourth occasion. While four (4) instances of the random access request message 220 are shown being transmitted, UE 115-*a* may transmit any quantity of instances of the random access request message 220 (e.g., two, three, four, five, six, seven, eight, nine, ten, eleven, twelve, etc.) in a corresponding quantity of occasions according to the RACH configuration information 215. For example, as part of this shown example in wireless communications system 200, the RACH configuration information 215 may indicate for UE 115-*a* to transmit the random access request message 220 in four (4) occasions (e.g., four (4) repetitions). Additionally, UE 115-*a* may continue to transmit the random access request message 220 according to this repetition scheme until a next SSB is received from base station 105-*a*. For example, UE 115-*a* may use the RACH configuration information 215 for transmitting the random access request message 220 for the two or more occasions until a subsequent RACH configuration is received from base station 105-*a*.

In some cases, UE 115-*a* may transmit each random access request message 220 with a same selected RACH preamble sequence from the indicated subset of RACH preambles. Additionally or alternatively, UE 115-*a* may transmit each random access request message 220 with linked RACH preamble sequences. That is, UE 115-*a* may select a RACH preamble sequence to use for transmitting each random access request message 220 and may apply different shifts (e.g., cyclic shifts) to the selected RACH preamble sequence for each random access request message 220. For example, UE 115-*a* may apply a first shift to the selected RACH preamble sequence when transmitting the first random access request message 220-*a*, a second shift to the selected RACH preamble sequence when transmitting the second random access request message 220-*b*, a third shift to the selected RACH preamble sequence when transmitting the third random access request message 220-*c*, and a fourth shift to the selected RACH preamble sequence when transmitting the fourth random access request message 220-*d*. Additionally or alternatively, UE 115-*a* may select different RACH preamble sequences from the indicated subset of RACH preambles for each random access request message 220 transmission (e.g., a first RACH preamble sequence for the first random access request message 220-*a*, a second RACH preamble sequence for the second random access request message 220-*b*, etc.).

Subsequently, base station 105-*a* may use (e.g., apply) different beams for reception of each random access request message 220 (e.g., each repetition) from UE 115-*a*. For example, the different beams that base station 105-*a* uses for receiving each random access request message 220 may include different refinements of an associated SSB beam (e.g., used to transmit synchronization information or other information to UE 115-*a*). Base station 105-*a* may combine each received random access request message 220 to successfully receive and decode the random access request message 220. If base station 105-*a* successfully receives and decodes the random access request message 220 (e.g., from each repetition), base station 105-*a* may proceed to transmit a RAR 225 (e.g., second RACH message, Msg2, MsgB, etc.) to UE 115-*a*.

Base station 105-*a* may transmit the RAR within a RAR window configured for the RACH procedure and for UE 115-*a*. In some cases, a length of the RAR window may be different when UE 115-*a* transmits the random access request message 220 during or using the two or more occasions (e.g., PRACH repetitions, random access request message 220 repetitions, etc.) than when UE 115-*a* transmits the random access request message 220 once. For example, base station 105-*a* may configure two different RAR window lengths, such as a first RAR window length for the random access request message 220 repetitions and a second RAR window length for a single random access request message 220 transmission. In some cases, base station 105-*a* may transmit an indication of the RAR window lengths in the RACH configuration information 215 or in a separate configuration message. For example, UE 115-*a* may identify the two different RAR window lengths from a single bitfield in a system information message (e.g., based on a table defined for the RACH procedure). Additionally, base station 105-*a* may determine the RAR window length for when UE 115-*a* transmits the random access request message 220 during the two or more occasions (e.g., PRACH repetitions, random access request message 220 repetitions, etc.) based on the RAR window length for when UE 115-*a* transmits the random access request message 220 once, a bandwidth used for the RACH procedure, a frequency range used for the RACH procedure, a frequency spectrum used for the RACH procedure, or a combination thereof.

Based on the RAR window length for when UE 115-*a* transmits the random access request message 220 during the two or more occasions, UE 115-*a* may identify when to transmit each instance of the random access request message 220. For example, UE 115-*a* may transmit the first random access request message 220-*a* during the first occasion, wait a duration equal to the RAR window length, transmit the second random access request message 220-*b* during the second occasion after the duration of the RAR window length expires, wait the duration equal to the RAR window length, transmit the third random access request message 220-*c* during the third occasion after the duration of the RAR window length expires, etc. After UE 115-*a* transmits a last random access request message 220 (e.g., a last repetition), UE 115-*a* may monitor for the RAR 225 during the RAR window according to the RAR window length. Additionally or alternatively, UE 115-a may monitor for the RAR 225 from base station 105-a during each respective RAR window after each corresponding random access request message 220 transmission. If the RAR 225 is detected and received, UE 115-a may proceed to transmit a third RACH message to base station 105-a to continue the RACH procedure. If the RAR 225 is not detected or successfully received, UE 115-a may transmit the random access request message 220 to base station 105-a again (e.g., using the repetition scheme described herein, a different repetition scheme, a single time, etc.) to reattempt the RACH procedure.

Figure 3:
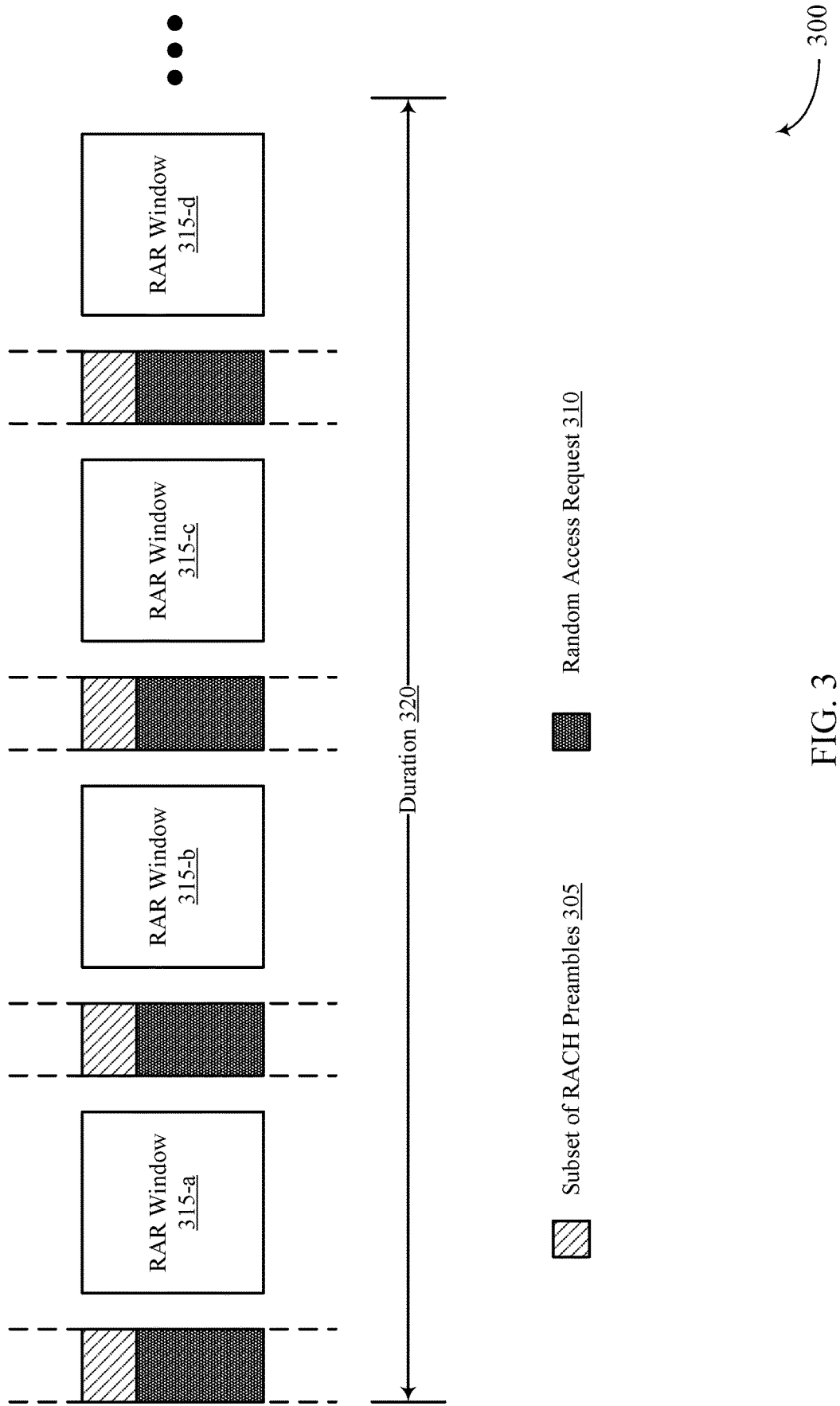
FIG. 3 illustrates an example of a repetitive random access transmission configuration in accordance with aspects of the present disclosure.

FIG. 3 illustrates an example of a repetitive random access transmission configuration 300 in accordance with aspects of the present disclosure. In some examples, repetitive random access transmission configuration 300 may implement aspects of or may be implemented by aspects of wireless communications system 100, wireless communications system 200, or both. For example, a base station 105 and a UE 115 may use the repetitive random access transmission configuration 300 as part of a RACH procedure to establish a connection between the base station 105 and the UE 115. Accordingly, as described herein, the UE 115 may transmit a first RACH message of the RACH procedure (e.g., a random access request message, a Msg1, a MsgA, etc.) during two or more occasions to increase chances that the base station 105 successfully receives and decodes the first RACH message.

The UE 115 may use a subset of RACH preambles 305 to transmit a random access request 310 during two or more occasions. The random access request 310 may be the first RACH message, and the UE 115 may transmit multiple instances of the random access request 310 during respective occasions. Additionally, the subset of RACH preambles 305 at the beginning of each instance of the random access request 310 may be a same preamble, a linked preamble (e.g., different shifts applied to the same preamble), or different preambles. The UE 115 may determine when to transmit each instance of the random access request 310 based on a length of a RAR window 315. For example, the base station 105 may configure the length of the RAR window 315 for the repetitive random access transmission configuration 300 (e.g., for when the UE 115 transmits the random access request 310 for the two or more occasions) and indicate the length to the UE 115 (e.g., in a RACH configuration information message).

For example, as shown, the UE 115 may transmit a first instance of the random access request 310 (e.g., with a selected RACH preamble from the subset of RACH preambles 305). Subsequently, the UE 115 may then transmit a second instance of the random access request 310 after a first RAR window 315-a expires, a third instance of the random access request 310 after a second RAR window 315-b expires, and a fourth instance of the random access request 310 after a third RAR window 315-c expires.

In some cases, the UE 115 may monitor each RAR window 315 for a RAR transmitted by the base station 105 in response to the transmissions of the random access request 310. Additionally or alternatively, the UE 115 may not monitor a RAR window 315 for the RAR until a final instance of the random access request 310 is transmitted in a final occasion. For example, if the fourth instance of the random access request 310 is the final instance and final occasion, the UE 115 may monitor for the RAR during a fourth RAR window 315-d that occurs after transmission of the fourth instance of the random access request 310. Accordingly, the UE 115 may use a monitoring procedure during the repetition segment of the RAR window 315 to monitor a single RAR window 315 or to monitor multiple RAR windows 315.

Additionally, the UE 115 may use the repetitive random access transmission configuration 300 for a duration 320. For example, the duration 320 may include a length of time between receiving a first SSB carrying configuration information for the repetitive random access transmission configuration 300 and receiving a second SSB carrying updated or additional configuration information for the repetitive random access transmission configuration 300.

Figure 4:
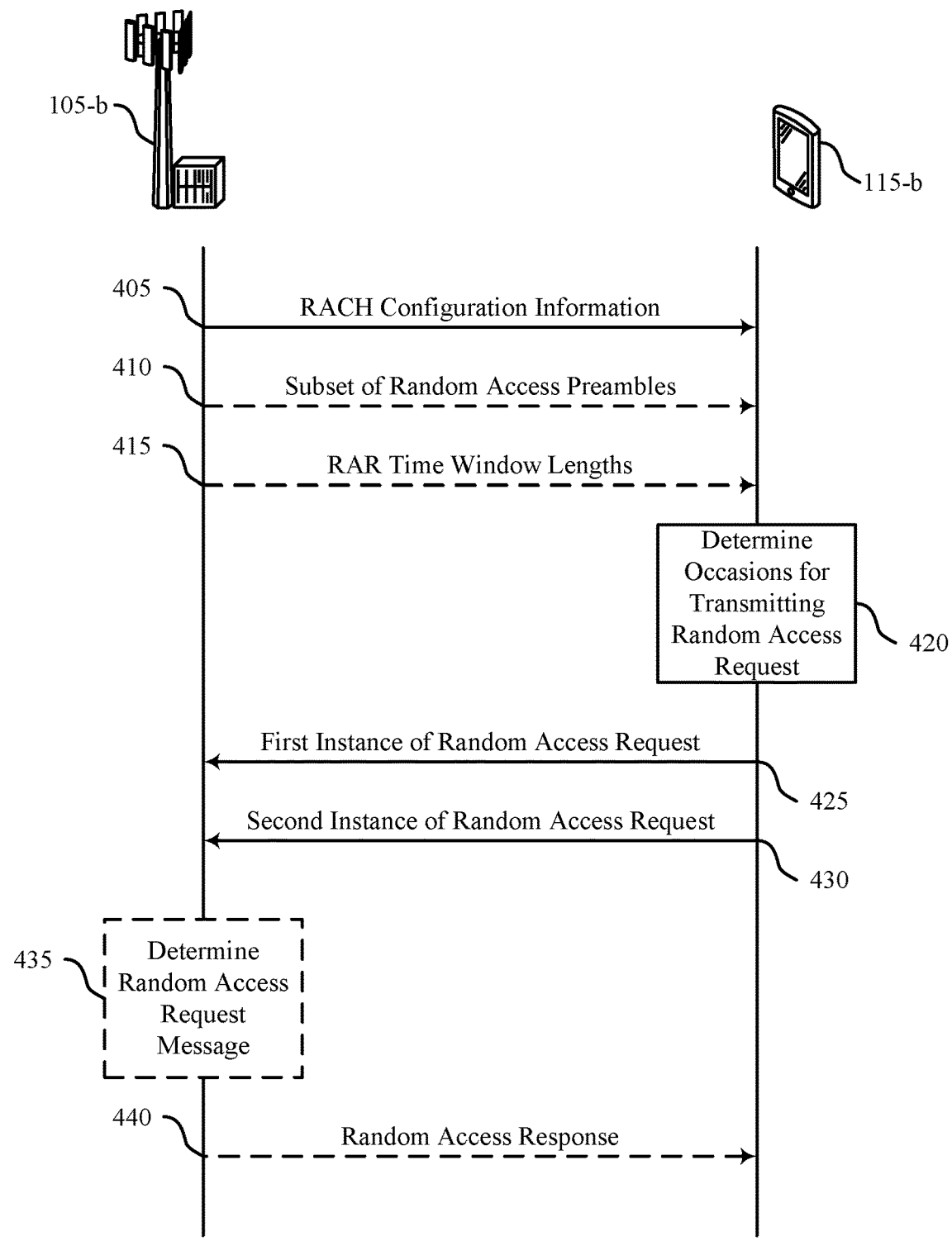
FIG. 4 illustrates an example of a process flow that supports repetitive random access transmissions in accordance with aspects of the present disclosure.

FIG. 4 illustrates an example of a process flow 400 that supports repetitive random access transmissions in accordance with aspects of the present disclosure. In some examples, process flow 400 may implement aspects of or may implemented by aspects of wireless communications system 100, wireless communications system 200, or both. For example, process flow 400 may include a base station 105-b and a UE 115-b, which may be examples of corresponding base stations 105 and UEs 115, respectively, as described with reference to FIGS. 1-3.

In the following description of process flow 400, the operations between UE 115-b and base station 105-b may be transmitted in a different order than the order shown, or the operations performed by base station 105-b and UE 115-b may be performed in different orders or at different times. Some operations may also be left out of process flow 400, or other operations may be added to process flow 400. The base station 105-b and the UE 115-b are shown performing a number of the operations of process flow 400, in some cases, any wireless device may perform the operations shown.

At 405, UE 115-b may receive, from base station 105-b, configuration information for performing a random access procedure (e.g., RACH procedure) with base station 105-b for a set of occasions associated with the configuration information. In some cases, UE 115-b may receive the configuration information via an SSB, a SIB (e.g., SIB1), system information (e.g., an RMSI message, SI message, etc.), or a combination thereof. Additionally, the set of occasions may occur between receiving a first SSB carrying the configuration information and receiving a second SSB carrying additional configuration information.

At 410, UE 115-b may receive, from base station 105-b, information indicating a subset of random access preambles (e.g., RACH preambles) associated with transmitting the random access request message for two or more occasions of the set of occasions (e.g., repetitions of the random access request message), the subset of random access preambles indicated from a set of random access preambles available for the random access procedure.

Subsequently, UE 115-b may select a random access preamble from the subset of random access preambles, where different instances of the random access request message (e.g., a first instance, a second instance, etc.) are transmitted with the selected random access preamble. In some cases, UE 115-a may apply a different cyclic shift to the random access preamble for each instance that the random access request message is transmitted (e.g., linked random access preambles). Additionally or alternatively, UE 115-b may select different random access preambles for each instance the random access request is transmitted. For example, UE 115-b may select a first random access preamble from the subset of random access preambles for transmission of a first instance of the random access request message during a first occasion and may select a second random access preamble from the subset of random access preambles for transmission of a second instance of the random access request message during a second occasion.

At 415, UE 115-*b* may receive, from base station 105-*b*, information indicating a first length of a time window associated with transmitting the random access request message for the two or more occasions of the set of occasions and a second length of the time window associated with transmitting the random access request message for a single occasion of the set of occasions. In some cases, the time window may be used for communicating to UE 115-*b* an RAR of the random access procedure, and the first length may be shorter than the second length. UE 115-*b* may determine the first length of the time window and the second length of the time window based on a single bitfield in the information, a table of time window lengths, or a combination thereof. Additionally, the first length of the time window may be based on the second length of the time window, a frequency range used for the random access procedure, a frequency band used for the random access procedure, or a combination thereof.

At 420, UE 115-*b* may determine to transmit a random access request message of the random access procedure during two or more occasions of the set of occasions based on a condition of a communication link between UE 115-*b* and base station 105-*b*. In some cases, UE 115-*b* may determine a number (e.g., a quantity) of occasions for the set of occasions to transmit the random access request message based on the configuration information. Additionally, the number of occasions to transmit the random access request message may be based on a bandwidth used for performing the random access procedure, a frequency range used for the random access procedure, a frequency spectrum band used for the random access procedure, or a combination thereof.

In some cases, UE 115-*b* may perform a power measurement associated with the communication link using the configuration information and may determine the power measurement satisfies a threshold value, where determining to transmit the random access request message during the two or more occasions is based on the power measurement satisfying the threshold value. For example, the power measurement may include an RSRP measurement, an RSSI measurement, a different measurement, or a combination thereof. Additionally or alternatively, UE 115-*b* may identify an exposure condition (e.g., an MPE condition) of UE 115-*b*, where the determining to transmit the random access request message during the two or more occasions is based on the exposure condition of the UE.

At 425, UE 115-*b* may transmit a first instance of the random access request message during a first occasion of the set of occasions.

At 430, UE 115-*b* may transmit a second instance of the random access request message during a second occasion of the set of occasions based on the determining to transmit the random access request message during the two or more occasions of the set of occasions. In some cases, the first instance of the random access request message may be transmitted before a first time window having the first length as described in 415, and the second instance of the random access request message may be transmitted after the first time window associated with the first instance expires according to the first length.

Base station 105-*b* may select a first beam to receive the first instance of the random access request message and may select a second beam to receive the second instance of the random access request message, where the second beam is different than the first beam. In some cases, the first beam and the second beam may differ based on a beam refinement procedure.

At 435, base station 105-*b* may attempt to receive and decode the random access request message (e.g., determine the random access request message) based on receiving the first instance and the second instance of the random access request message. For example, base station 105-*b* may combine the first instance and the second instance to fully receive and decode the random access request message.

At 440, UE 115-*b* may monitor for the random access response of the random access procedure after a last instance of the random access request message is transmitted, where the random access response is monitored during the time window according to the first length. For example, base station 105-*b* may transmit, to UE 115-*b*, a random access response of the random access procedure during the time window configured for communicating the random access response. In some cases, base station 105-*b* may transmit the random access response based on receiving the first instance and the second instance of the random access request message during two or more occasions of the set of occasions.

Figure 5:
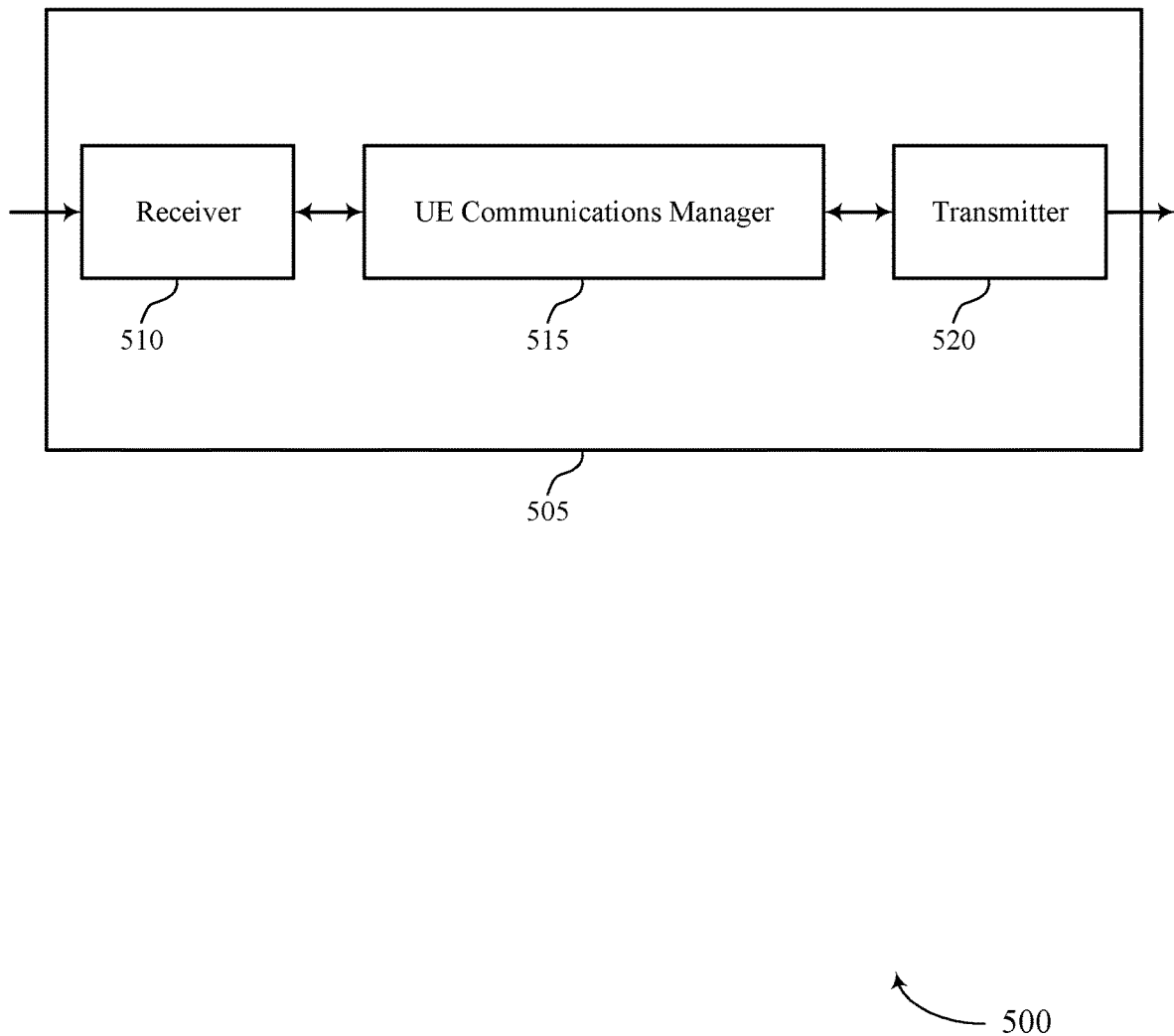
FIGS. 5 and 6 show block diagrams of devices that support repetitive random access transmissions in accordance with aspects of the present disclosure.

FIG. 5 shows a block diagram 500 of a device 505 that supports repetitive random access transmissions in accordance with aspects of the present disclosure. The device 505 may be an example of aspects of a UE 115 as described herein. The device 505 may include a receiver 510, a UE communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to repetitive random access transmissions, etc.). Information may be passed on to other components of the device 505. The receiver 510 may be an example of aspects of the transceiver 820 described with reference to FIG. 8. The receiver 510 may utilize a single antenna or a set of antennas.

The UE communications manager 515 may receive, from a base station, configuration information for performing a random access procedure with the base station for a set of occasions associated with the configuration information. In some cases, the UE communications manager 515 may determine to transmit a random access request message of the random access procedure during two or more occasions of the set of occasions based on a condition of a communication link between the UE and the base station. Additionally, the UE communications manager 515 may transmit a first instance of the random access request message during a first occasion of the set of occasions and a second instance of the random access request message during a second occasion of the set of occasions based on the determining to transmit the random access request message during the two or more occasions of the set of occasions. The UE communications manager 515 may be an example of aspects of the UE communications manager 810 described herein.

In some examples, the UE communications manager 515 as described herein may be implemented to realize one or more potential advantages for a UE 115. For example, based on transmitting at least a first instance and a second instance of a random access request message during corresponding occasions, the UE communications manager 515 may enable the UE 115 to more efficiently perform a RACH procedure. The multiple instances of the random access request message (e.g., repetitions) may enable a base station 105 to have a higher likelihood of successfully receiving and decoding the random access request message, thereby decreasing latency for the RACH procedure and potentially mitigating additional RACH procedures from being performed to establish a connection between the UE 115 and the base station 105. Additionally, the UE communications manager 515 may decrease signaling overhead that may arise from reattempting a RACH procedure if the random access request message is unsuccessfully received or decoded at the base station 105.

The UE communications manager 515, or its sub-components, may be implemented in hardware, code (e.g., software or firmware) executed by a processor, or any combination thereof. If implemented in code executed by a processor, the functions of the UE communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 515, or its sub-components, may be physically located at various positions, including being distributed such that portions of functions are implemented at different physical locations by one or more physical components. In some examples, the UE communications manager 515, or its sub-components, may be a separate and distinct component in accordance with various aspects of the present disclosure. In some examples, the UE communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver component. For example, the transmitter 520 may be an example of aspects of the transceiver 820 described with reference to FIG. 8. The transmitter 520 may utilize a single antenna or a set of antennas.

Figure 6:
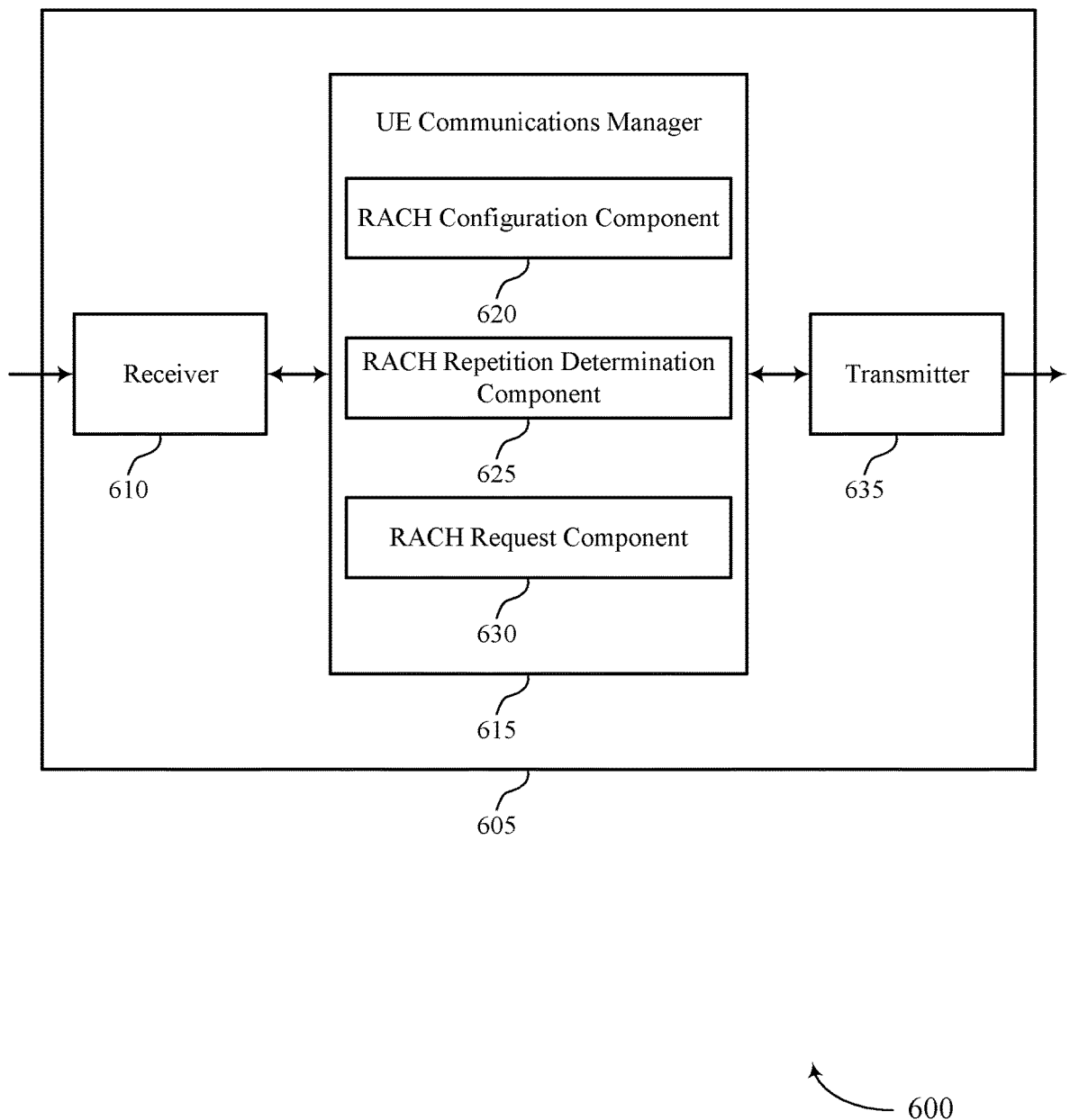

FIG. 6 shows a block diagram 600 of a device 605 that supports repetitive random access transmissions in accordance with aspects of the present disclosure. The device 605 may be an example of aspects of a device 505, or a UE 115 as described herein. The device 605 may include a receiver 610, a UE communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to repetitive random access transmissions, etc.). Information may be passed on to other components of the device 605. The receiver 610 may be an example of aspects of the transceiver 820 described with reference to FIG. 8. The receiver 610 may utilize a single antenna or a set of antennas.

The UE communications manager 615 may be an example of aspects of the UE communications manager 515 as described herein. The UE communications manager 615 may include a RACH configuration component 620, a RACH repetition determination component 625, and a RACH request component 630. The UE communications manager 615 may be an example of aspects of the UE communications manager 810 described herein.

The RACH configuration component 620 may receive, from a base station, configuration information for performing a random access procedure with the base station for a set of occasions associated with the configuration information.

The RACH repetition determination component 625 may determine to transmit a random access request message of the random access procedure during two or more occasions of the set of occasions based on a condition of a communication link between the UE and the base station.

The RACH request component 630 may transmit a first instance of the random access request message during a first occasion of the set of occasions and a second instance of the random access request message during a second occasion of the set of occasions based on the determining to transmit the random access request message during the two or more occasions of the set of occasions.

Based on techniques for transmitting the first instance and the second instance of the random access request message, a processor of a UE 115 (e.g., controlling the receiver 610, the transmitter 635, or the transceiver 820 as described with reference to FIG. 8) may decrease latency and signaling overhead that would result from a base station 105 not receiving the random access request message if the random access request message was transmitted in one instance during a single occasion. For example, the multiple instances of the random access request message may enable the base station 105 to combine the different instances to increase a likelihood that the random access request message is successfully decoded. Accordingly, the base station 105 and the UE 115 may have a higher likelihood of establishing a connection in a single RACH procedure rather than reattempting a RACH procedure or retransmitting different RACH messages, thereby decreasing latency and reducing signaling overhead.

The transmitter 635 may transmit signals generated by other components of the device 605. In some examples, the transmitter 635 may be collocated with a receiver 610 in a transceiver component. For example, the transmitter 635 may be an example of aspects of the transceiver 820 described with reference to FIG. 8. The transmitter 635 may utilize a single antenna or a set of antennas.

Figure 7:
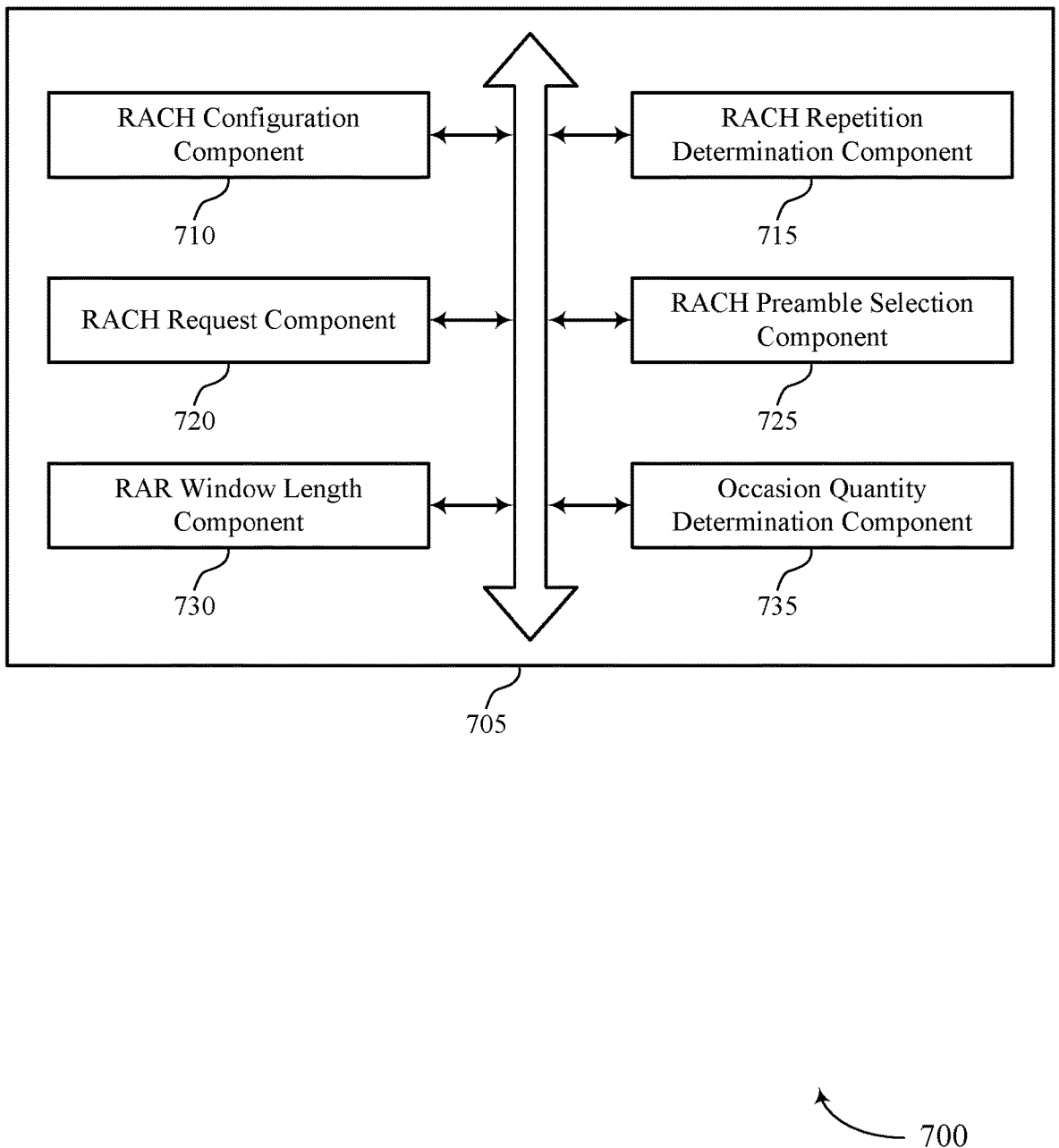
FIG. 7 shows a block diagram of a user equipment communications manager that supports repetitive random access transmissions in accordance with aspects of the present disclosure.

FIG. 7 shows a block diagram 700 of a UE communications manager 705 that supports repetitive random access transmissions in accordance with aspects of the present disclosure. The UE communications manager 705 may be an example of aspects of a UE communications manager 515, a UE communications manager 615, or a UE communications manager 810 described herein. The UE communications manager 705 may include a RACH configuration component 710, a RACH repetition determination component 715, a RACH request component 720, a RACH preamble selection component 725, a RAR window length component 730, and an occasion quantity determination component 735. Each of these components may communicate, directly or indirectly, with one another (e.g., via one or more buses).

The RACH configuration component 710 may receive, from a base station, configuration information for performing a random access procedure with the base station for a set of occasions associated with the configuration information. In some cases, the configuration information may be received via an SSB, a SIB, system information, or a combination thereof. Additionally, the set of occasions may occur between receiving a first SSB carrying the configuration information and receiving a second SSB carrying additional configuration information.

The RACH repetition determination component 715 may determine to transmit a random access request message of the random access procedure during two or more occasions of the set of occasions based on a condition of a communication link between the UE and the base station. In some examples, the RACH repetition determination component 715 may perform a power measurement associated with the communication link using the configuration information and may determine the power measurement satisfies a threshold value, where determining to transmit the random access request message during the two or more occasions is based on the power measurement satisfying the threshold value. In some cases, the power measurement may include an RSRP measurement, an RSSI measurement, or a combination thereof. Additionally or alternatively, the RACH repetition determination component 715 may identify an exposure condition of the UE, where the determining to transmit the random access request message during the two or more occasions is based on the exposure condition of the UE.

The RACH request component 720 may transmit a first instance of the random access request message during a first occasion of the set of occasions and a second instance of the random access request message during a second occasion of the set of occasions based on the determining to transmit the random access request message during the two or more occasions of the set of occasions.

The RACH preamble selection component 725 may receive, from the base station, information indicating a subset of random access preambles associated with transmitting the random access request message for the two or more occasions of the set of occasions, the subset of random access preambles indicated from a set of random access preambles available for the random access procedure, where the determining to transmit the random access request message during the two or more occasions is based on receiving the information. In some examples, the RACH preamble selection component 725 may select a random access preamble from the subset of random access preambles, where transmitting the first instance and the second instance of the random access request message during the first occasion and the second occasion includes transmitting the random access preamble. In some cases, a different cyclic shift may be applied to the random access preamble for each instance that the random access request message is transmitted.

Additionally or alternatively, the RACH preamble selection component 725 may select a first random access preamble from the subset of random access preambles for the first occasion, where transmitting the first instance of the random access request message during the first occasion includes transmitting the first random access preamble, and may select a second random access preamble from the subset of random access preambles for the second occasion, where transmitting the second instance of the random access request message during the second occasion includes transmitting the second random access preamble.

The RAR window length component 730 may receive, from the base station, information indicating a first length of a time window associated with transmitting the random access request message for the two or more occasions of the set of occasions and a second length of the time window associated with transmitting the random access request message for a single occasion of the set of occasions. In some cases, the time window may be used for communicating to the UE a RAR of the random access procedure, and the first length may be shorter than the second length. In some examples, the RAR window length component 730 may monitor for the RAR of the random access procedure after a last instance of the random access request message is transmitted, where the RAR is monitored during the time window according to the first length.

Additionally, the RAR window length component 730 may determine the first length of the time window and the second length of the time window based on a single bitfield in the information, a table of time window lengths, or a combination thereof. In some cases, the first instance of the random access request message may be transmitted before a first time window having the first length, and the second instance of the random access request message may be transmitted after the first time window associated with the first instance expires according to the first length. In some cases, the first length of the time window may be based on the second length of the time window, a frequency range used for the random access procedure, a frequency band used for the random access procedure, or a combination thereof.

The occasion quantity determination component 735 may determine a quantity of occasions for the set of occasions to transmit the random access request message based on the configuration information, where determining to transmit the random access request message during the two or more occasions is based on determining the quantity of occasions. In some cases, the quantity of occasions to transmit the random access request message may be based on a bandwidth used for performing the random access procedure, a frequency range used for the random access procedure, a frequency spectrum band used for the random access procedure, or a combination thereof.

Figure 8:
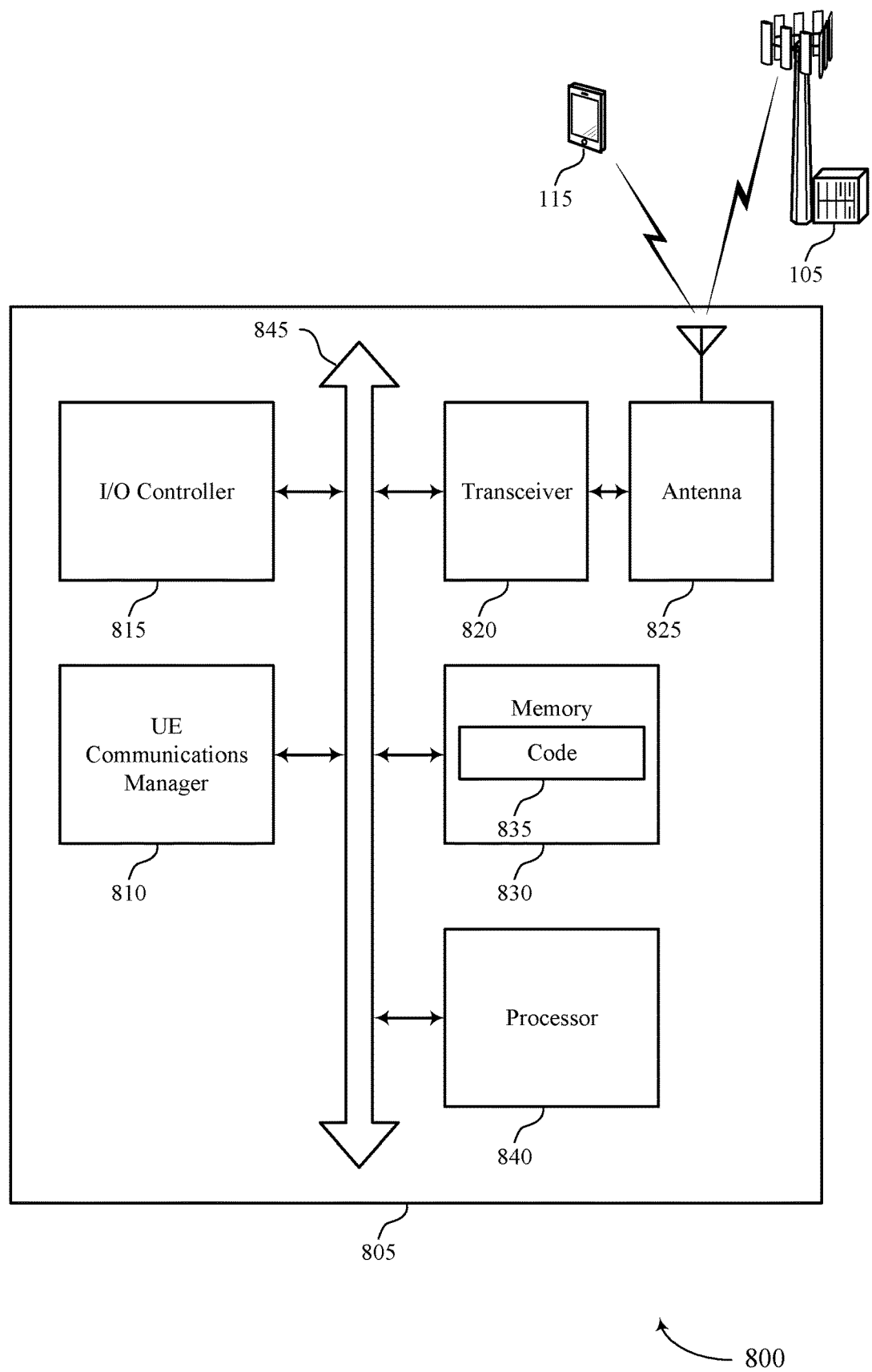
FIG. 8 shows a diagram of a system including a device that supports repetitive random access transmissions in accordance with aspects of the present disclosure.

FIG. 8 shows a diagram of a system 800 including a device 805 that supports repetitive random access transmissions in accordance with aspects of the present disclosure. The device 805 may be an example of or include the components of device 505, device 605, or a UE 115 as described herein. The device 805 may include components for bi-directional voice and data communications including components for transmitting and receiving communications, including a UE communications manager 810, an I/O controller 815, a transceiver 820, an antenna 825, memory 830, and a processor 840. These components may be in electronic communication via one or more buses (e.g., bus 845).

The UE communications manager 810 may receive, from a base station, configuration information for performing a random access procedure with the base station for a set of occasions associated with the configuration information. In some cases, the UE communications manager 810 may determine to transmit a random access request message of the random access procedure during two or more occasions of the set of occasions based on a condition of a communication link between the UE and the base station. Additionally, the UE communications manager 810 may transmit a first instance of the random access request message during a first occasion of the set of occasions and a second instance of the random access request message during a second occasion of the set of occasions based on the determining to transmit the random access request message during the two or more occasions of the set of occasions.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting repetitive random access transmissions).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
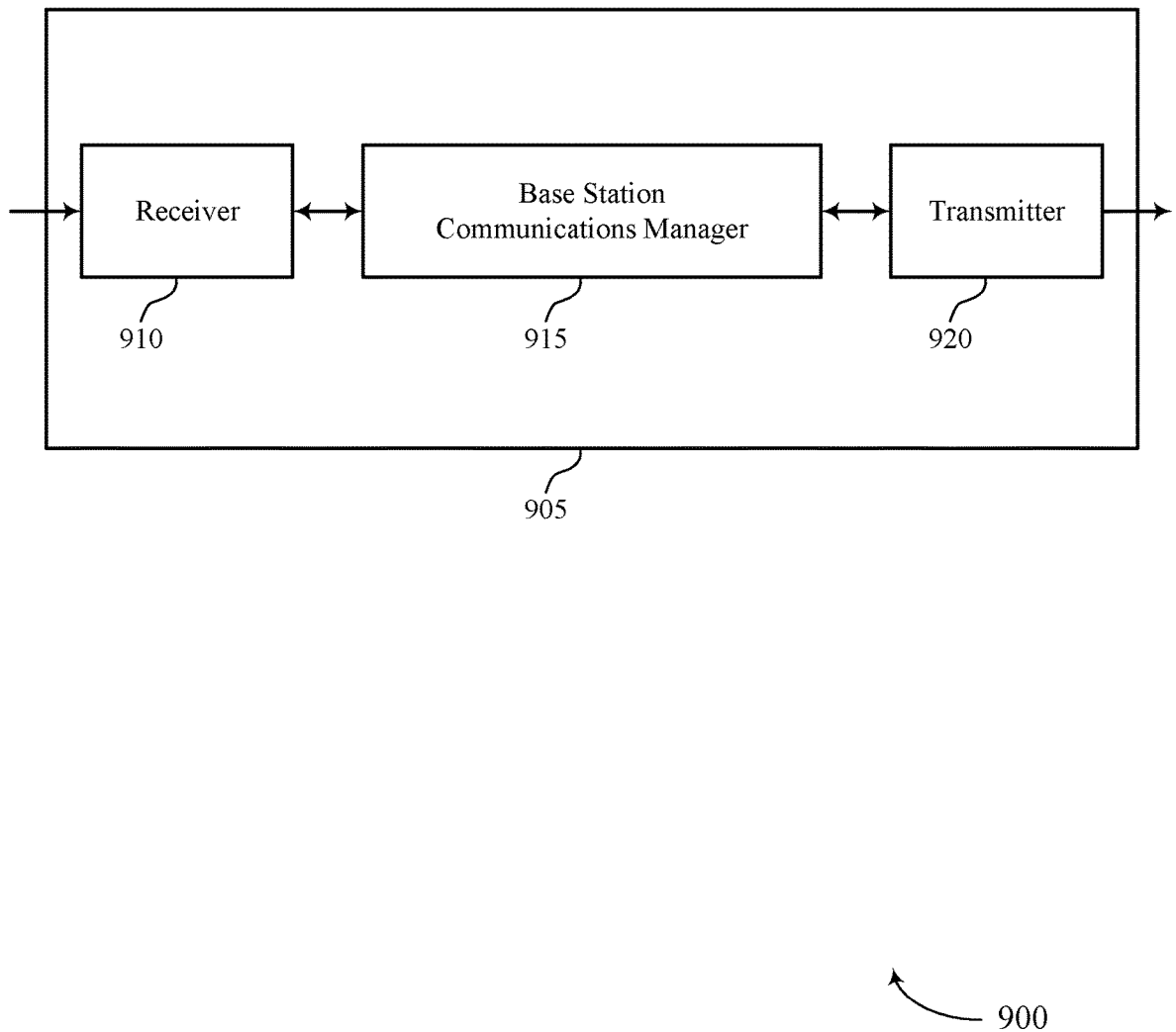
FIGS. 9 and 10 show block diagrams of devices that support repetitive random access transmissions in accordance with aspects of the present disclosure.

FIG. 9 shows a block diagram 900 of a device 905 that supports repetitive random access transmissions in accordance with aspects of the present disclosure. The device 905 may be an example of aspects of a base station 105 as described herein. The device 905 may include a receiver 910, a base station communications manager 915, and a transmitter 920.

The device 905 may also include a processor. Each of these components may be in communication with one another (e.g., via one or more buses).

The receiver 910 may receive information such as packets, user data, or control information associated with various information channels (e.g., control channels, data channels, and information related to repetitive random access transmissions, etc.). Information may be passed on to other components of the device 905. The receiver 910 may be an example of aspects of the transceiver 1220 described with reference to FIG. 12. The receiver 910 may utilize a single antenna or a set of antennas.

The base station communications manager 915 may transmit, to a UE, configuration information for the UE to perform a random access procedure with the base station for a set of occasions associated with the configuration information. In some cases, the base station communications manager 915 receive, from the UE, a first instance of a random access request message for the random access procedure during a first occasion of the set of occasions. Additionally, the base station communications manager 915 receive, from the UE, a second instance of the random access request message for the random access procedure during a second occasion of the set of occasions, the second occasion occurring after the first occasion. In some cases, the base station communications manager 915 transmit, to the UE, a RAR of the random access procedure during a time window configured for communicating the RAR, the RAR transmitted based on receiving the first instance and the second instance of the random access request message during two or more occasions of the set of occasions. The base station communications manager 915 may be an example of aspects of the base station communications manager 1210 described herein.

The base station communications manager 915, or its sub-components, may be implemented in hardware, code (e.g., software or firmware) executed by a processor, or any combination thereof. If implemented in code executed by a processor, the functions of the base station communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 915, or its sub-components, may be physically located at various positions, including being distributed such that portions of functions are implemented at different physical locations by one or more physical components. In some examples, the base station communications manager 915, or its sub-components, may be a separate and distinct component in accordance with various aspects of the present disclosure. In some examples, the base station communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver component. For example, the transmitter 920 may be an example of aspects of the transceiver 1220 described with reference to FIG. 12. The transmitter 920 may utilize a single antenna or a set of antennas.

Figure 10:
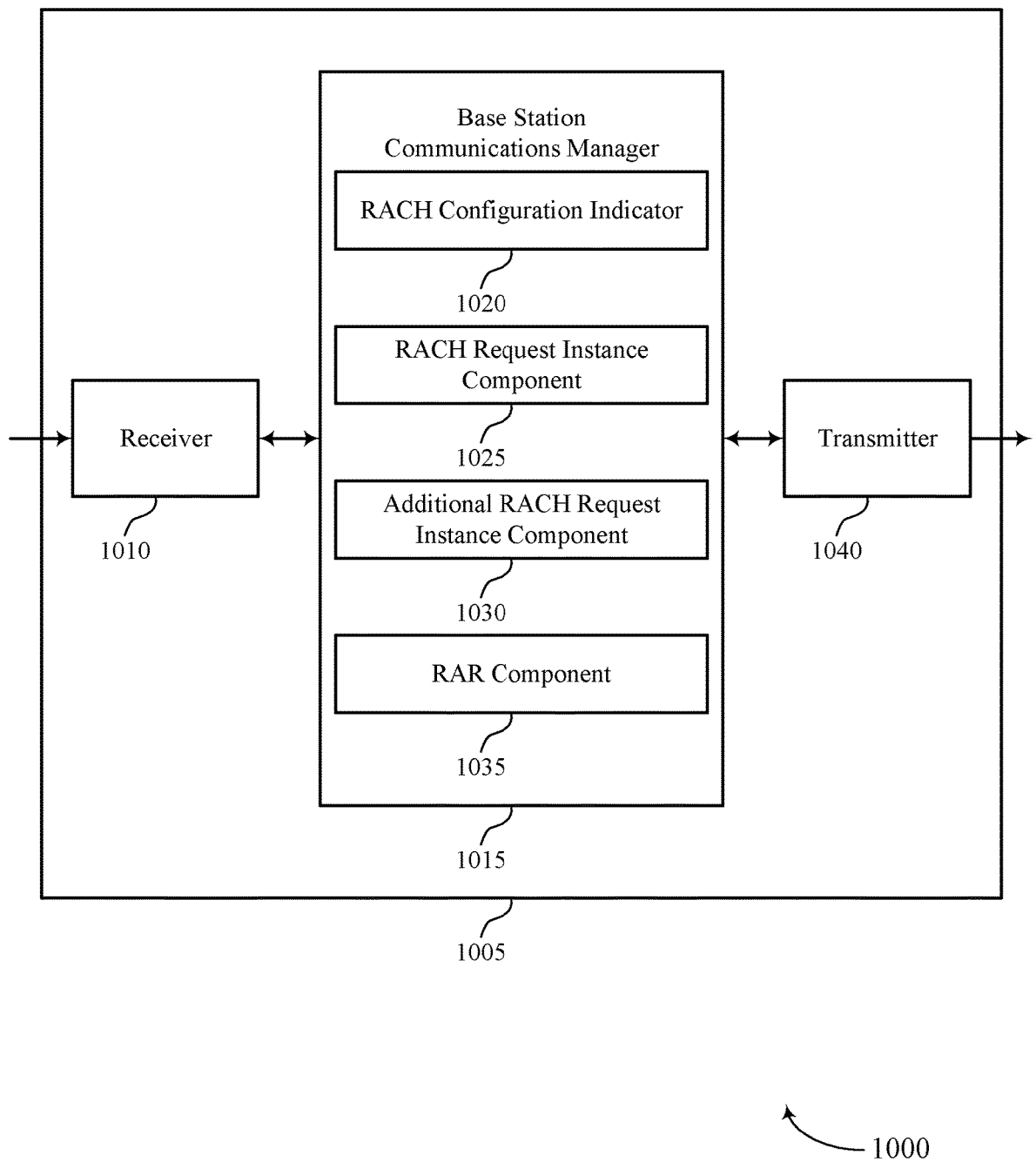

FIG. 10 shows a block diagram 1000 of a device 1005 that supports repetitive random access transmissions in accordance with aspects of the present disclosure. The device 1005 may be an example of aspects of a device 905, or a base station 105 as described herein. The device 1005 may include a receiver 1010, a base station communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to repetitive random access transmissions, etc.). Information may be passed on to other components of the device 1005. The receiver 1010 may be an example of aspects of the transceiver 1220 described with reference to FIG. 12. The receiver 1010 may utilize a single antenna or a set of antennas.

The base station communications manager 1015 may be an example of aspects of the base station communications manager 915 as described herein. The base station communications manager 1015 may include a RACH configuration indicator 1020, a RACH request instance component 1025, an additional RACH request instance component 1030, and a RAR component 1035. The base station communications manager 1015 may be an example of aspects of the base station communications manager 1210 described herein.

The RACH configuration indicator 1020 may transmit, to a UE, configuration information for the UE to perform a random access procedure with the base station for a set of occasions associated with the configuration information.

The RACH request instance component 1025 may receive, from the UE, a first instance of a random access request message for the random access procedure during a first occasion of the set of occasions.

The additional RACH request instance component 1030 may receive, from the UE, a second instance of the random access request message for the random access procedure during a second occasion of the set of occasions, the second occasion occurring after the first occasion.

The RAR component 1035 may transmit, to the UE, a RAR of the random access procedure during a time window configured for communicating the RAR, the RAR transmitted based on receiving the first instance and the second instance of the random access request message during two or more occasions of the set of occasions.

The transmitter 1040 may transmit signals generated by other components of the device 1005. In some examples, the transmitter 1040 may be collocated with a receiver 1010 in a transceiver component. For example, the transmitter 1040 may be an example of aspects of the transceiver 1220 described with reference to FIG. 12. The transmitter 1040 may utilize a single antenna or a set of antennas.

Figure 11:
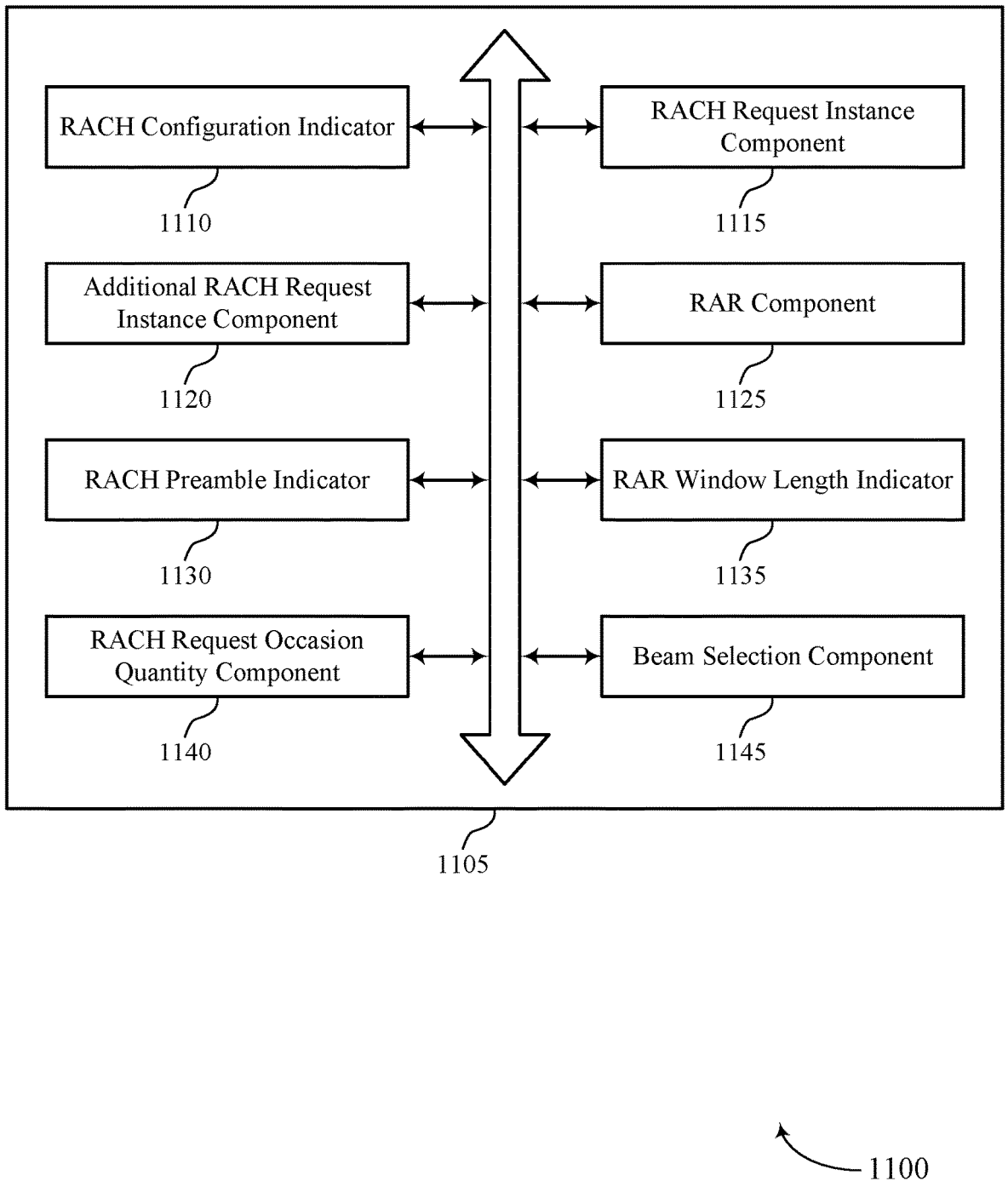
FIG. 11 shows a block diagram of a base station communications manager that supports repetitive random access transmissions in accordance with aspects of the present disclosure.

FIG. 11 shows a block diagram 1100 of a base station communications manager 1105 that supports repetitive random access transmissions in accordance with aspects of the present disclosure. The base station communications manager 1105 may be an example of aspects of a base station communications manager 915, a base station communications manager 1015, or a base station communications manager 1210 described herein. The base station communications manager 1105 may include a RACH configuration indicator 1110, a RACH request instance component 1115, an additional RACH request instance component 1120, a RAR component 1125, a RACH preamble indicator 1130, a RAR window length indicator 1135, a RACH request occasion quantity component 1140, and a beam selection component 1145. Each of these components may communicate, directly or indirectly, with one another (e.g., via one or more buses).

The RACH configuration indicator 1110 may transmit, to a UE, configuration information for the UE to perform a random access procedure with the base station for a set of occasions associated with the configuration information. In some cases, the configuration information may be transmitted via an SSB, a SIB, system information, or a combination thereof. Additionally, the set of occasions may occur between transmitting a first SSB carrying the configuration information and transmitting an SSB carrying additional configuration information.

The RACH request instance component 1115 may receive, from the UE, a first instance of a random access request message for the random access procedure during a first occasion of the set of occasions.

The additional RACH request instance component 1120 may receive, from the UE, a second instance of the random access request message for the random access procedure during a second occasion of the set of occasions, the second occasion occurring after the first occasion. In some examples, the additional RACH request instance component 1120 may determine the UE is to transmit the random access request message for the two or more occasions of the set of occasions, where the first instance and the second instance of the random access request message are received based on the determining that the UE is to transmit the random access request message for the two or more occasions of the set of occasions. In some cases, the determining that the UE is to transmit the random access request message for the two or more occasions of the set of occasions may be based on a power measurement, an exposure condition of the UE, or a combination thereof.

The RAR component 1125 may transmit, to the UE, a RAR of the random access procedure during a time window configured for communicating the RAR, the RAR transmitted based on receiving the first instance and the second instance of the random access request message during two or more occasions of the set of occasions.

The RACH preamble indicator 1130 may transmit, to the UE, information indicating a subset of random access preambles associated with the UE transmitting the random access request message for the two or more occasions of the set of occasions, the subset of random access preambles indicated from a set of random access preambles available for the random access procedure. In some cases, the first instance and the second instance of the random access request message may be received with a same random access preamble or different random access preambles. Additionally or alternatively, the first instance of the random access request message may be received with a random access preamble with a first cyclic shift applied, and the second instance of the random access request message may be received with the random access preamble with a second cyclic shift applied.

The RAR window length indicator 1135 may transmit, to the UE, information indicating a first length of the time window associated with the UE transmitting the random access request message for the two or more occasions of the set of occasions and a second length of the time window associated with the UE transmitting the random access request message for a single occasion of the set of occasions, the first length being shorter than the second length. In some examples, the RAR window length indicator 1135 may determine the first length of the time window based on the second length of the time window, a frequency range used for the random access procedure, a frequency band used for the random access procedure, or a combination thereof. In some cases, the first length of the time window and the second length of the time window may be indicated based on a single bitfield in the signaling, a table of time window lengths, or a combination thereof. Additionally, the second instance of the random access request message may be received after the first instance of the random access request message according to the first length.

The RACH request occasion quantity component 1140 may determine a quantity of occasions that the UE is to transmit the random access request message, where the quantity of occasions is based on a bandwidth used for performing the random access procedure, a frequency range used for the random access procedure, a frequency band used for the random access procedure, or a combination thereof. In some examples, the RACH request occasion quantity component 1140 may transmit, to the UE, an indication of the quantity of occasions in the configuration information.

The beam selection component 1145 may select a first beam to receive the first instance of the random access request message. In some examples, the beam selection component 1145 may select a second beam to receive the second instance of the random access request message, the second beam being different than the first beam. In some cases, the first beam and the second beam may differ based on a beam refinement procedure.

Figure 12:
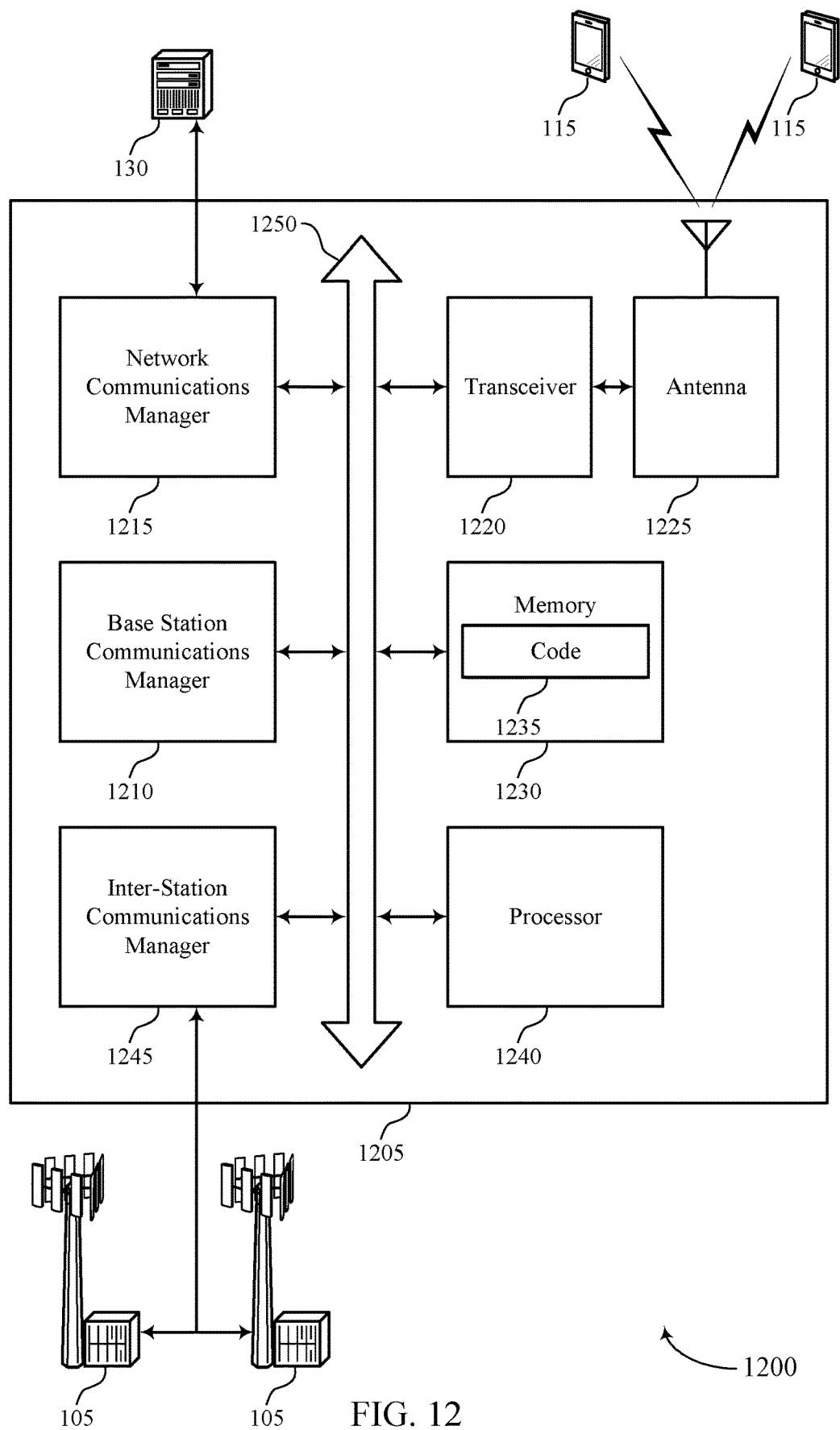
FIG. 12 shows a diagram of a system including a device that supports repetitive random access transmissions in accordance with aspects of the present disclosure.

FIG. 12 shows a diagram of a system 1200 including a device 1205 that supports repetitive random access transmissions in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a base station communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The base station communications manager 1210 may transmit, to a UE, configuration information for the UE to perform a random access procedure with the base station for a set of occasions associated with the configuration information. In some cases, the base station communications manager 1210 may receive, from the UE, a first instance of a random access request message for the random access procedure during a first occasion of the set of occasions. Additionally, the base station communications manager 1210 may receive, from the UE, a second instance of the random access request message for the random access procedure during a second occasion of the set of occasions, the second occasion occurring after the first occasion. In some cases, the base station communications manager 1210 may transmit, to the UE, a RAR of the random access procedure during a time window configured for communicating the RAR, the RAR transmitted based on receiving the first instance and the second instance of the random access request message during two or more occasions of the set of occasions.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting repetitive random access transmissions).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
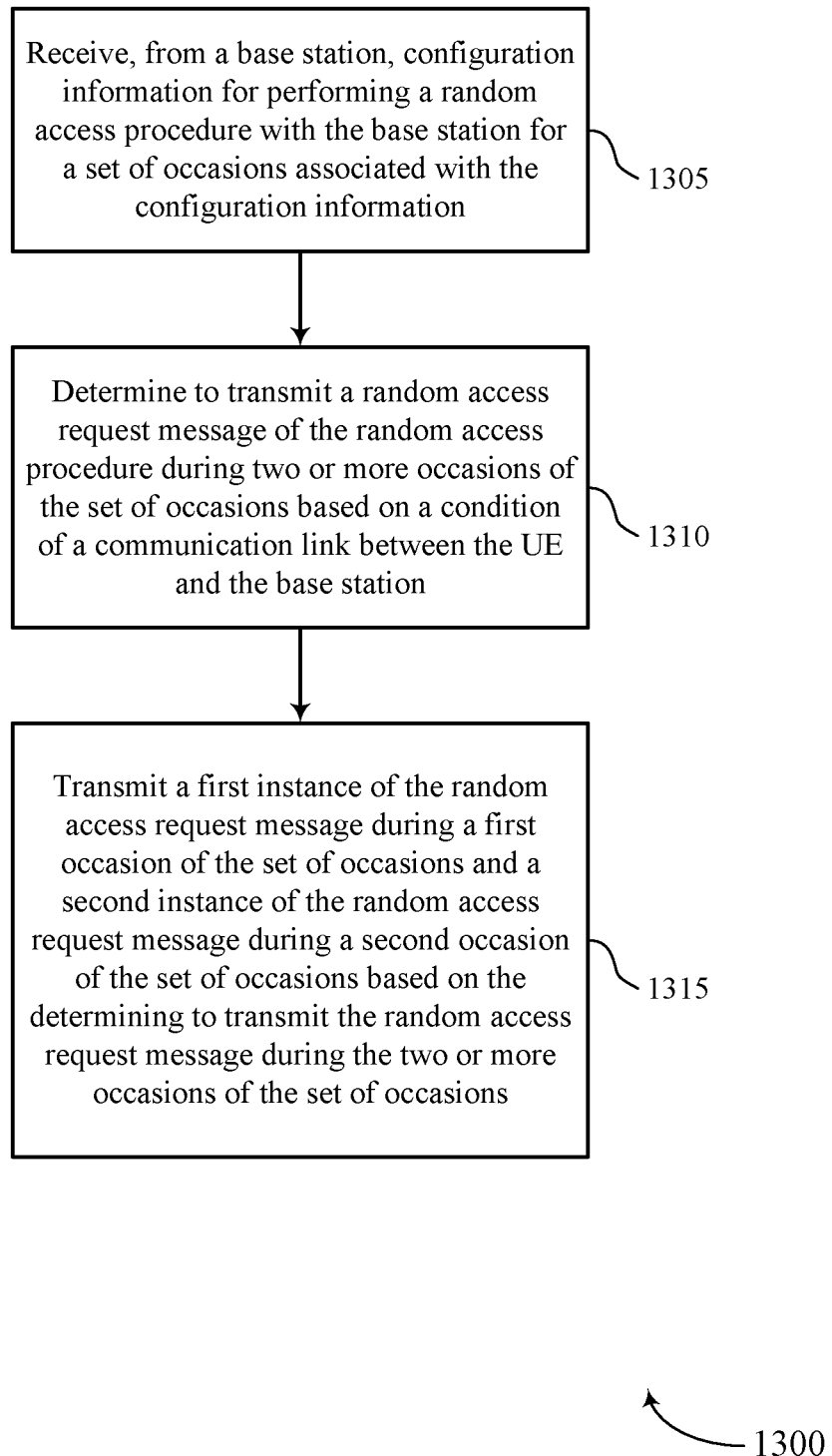
FIGS. 13 through 19 show flowcharts illustrating methods that support repetitive random access transmissions in accordance with aspects of the present disclosure.

FIG. 13 shows a flowchart illustrating a method 1300 that supports repetitive random access transmissions in accordance with aspects of the present disclosure. The operations of method 1300 may be implemented by a UE 115 or its components as described herein. For example, the operations of method 1300 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive, from a base station, configuration information for performing a random access procedure with the base station for a set of occasions associated with the configuration information. The operations of 1305 may be performed according to the methods described herein. In some examples, aspects of the operations of 1305 may be performed by a RACH configuration component as described with reference to FIGS. 5 through 8.

At 1310, the UE may determine to transmit a random access request message of the random access procedure during two or more occasions of the set of occasions based on a condition of a communication link between the UE and the base station. The operations of 1310 may be performed according to the methods described herein. In some examples, aspects of the operations of 1310 may be performed by a RACH repetition determination component as described with reference to FIGS. 5 through 8.

At 1315, the UE may transmit a first instance of the random access request message during a first occasion of the set of occasions and a second instance of the random access request message during a second occasion of the set of occasions based on the determining to transmit the random access request message during the two or more occasions of the set of occasions. The operations of 1315 may be performed according to the methods described herein. In some examples, aspects of the operations of 1315 may be performed by a RACH request component as described with reference to FIGS. 5 through 8.

Figure 14:
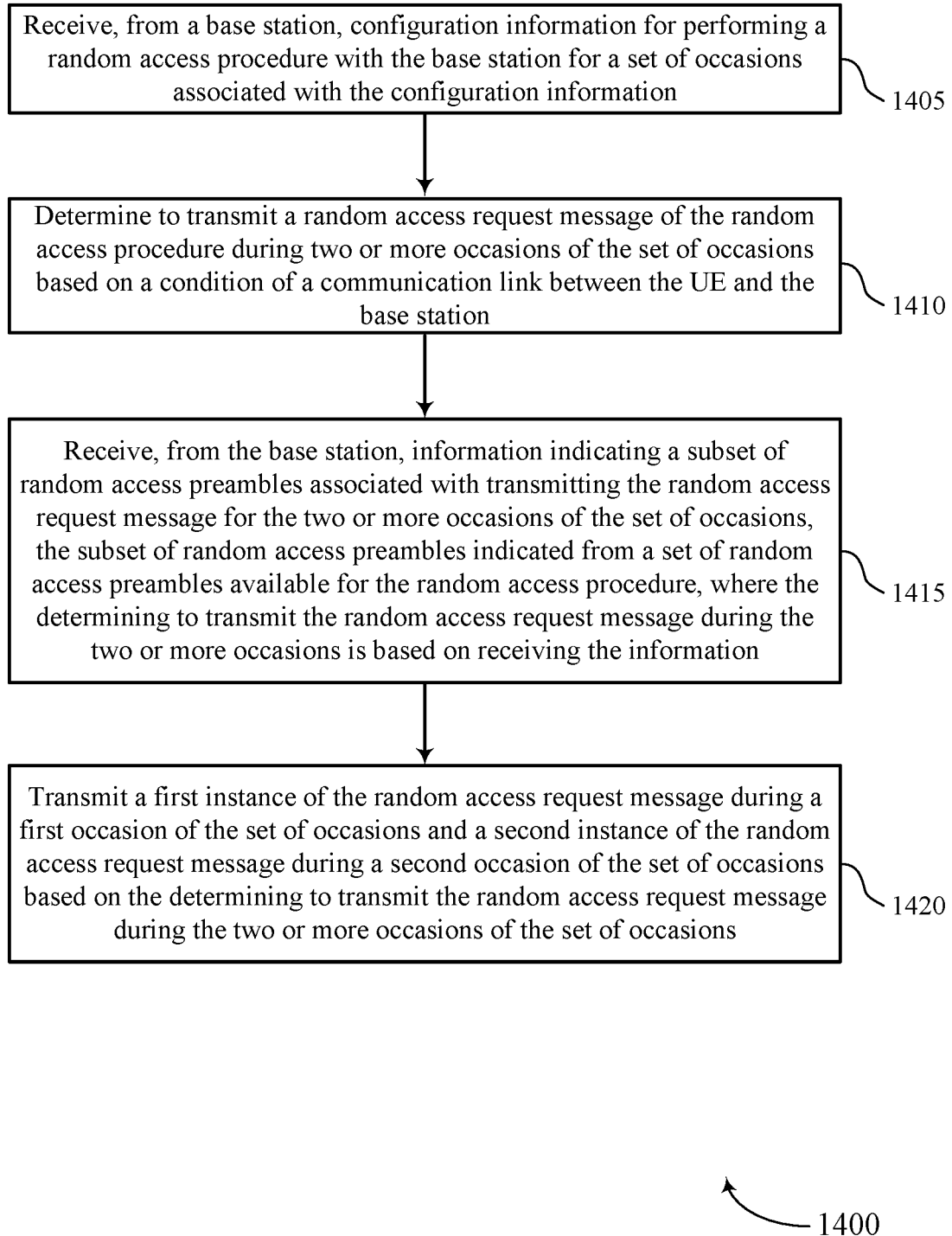

FIG. 14 shows a flowchart illustrating a method 1400 that supports repetitive random access transmissions in accordance with aspects of the present disclosure. The operations of method 1400 may be implemented by a UE 115 or its components as described herein. For example, the operations of method 1400 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station, configuration information for performing a random access procedure with the base station for a set of occasions associated with the configuration information. The operations of 1405 may be performed according to the methods described herein. In some examples, aspects of the operations of 1405 may be performed by a RACH configuration component as described with reference to FIGS. 5 through 8.

At 1410, the UE may determine to transmit a random access request message of the random access procedure during two or more occasions of the set of occasions based on a condition of a communication link between the UE and the base station. The operations of 1410 may be performed according to the methods described herein. In some examples, aspects of the operations of 1410 may be performed by a RACH repetition determination component as described with reference to FIGS. 5 through 8.

At 1415, the UE may receive, from the base station, information indicating a subset of random access preambles associated with transmitting the random access request message for the two or more occasions of the set of occasions, the subset of random access preambles indicated from a set of random access preambles available for the random access procedure, where the determining to transmit the random access request message during the two or more occasions is based on receiving the information. The operations of 1415 may be performed according to the methods described herein. In some examples, aspects of the operations of 1415 may be performed by a RACH preamble selection component as described with reference to FIGS. 5 through 8.

At 1420, the UE may transmit a first instance of the random access request message during a first occasion of the set of occasions and a second instance of the random access request message during a second occasion of the set of occasions based on the determining to transmit the random access request message during the two or more occasions of the set of occasions. The operations of 1420 may be performed according to the methods described herein. In some examples, aspects of the operations of 1420 may be performed by a RACH request component as described with reference to FIGS. 5 through 8.

Figure 15:
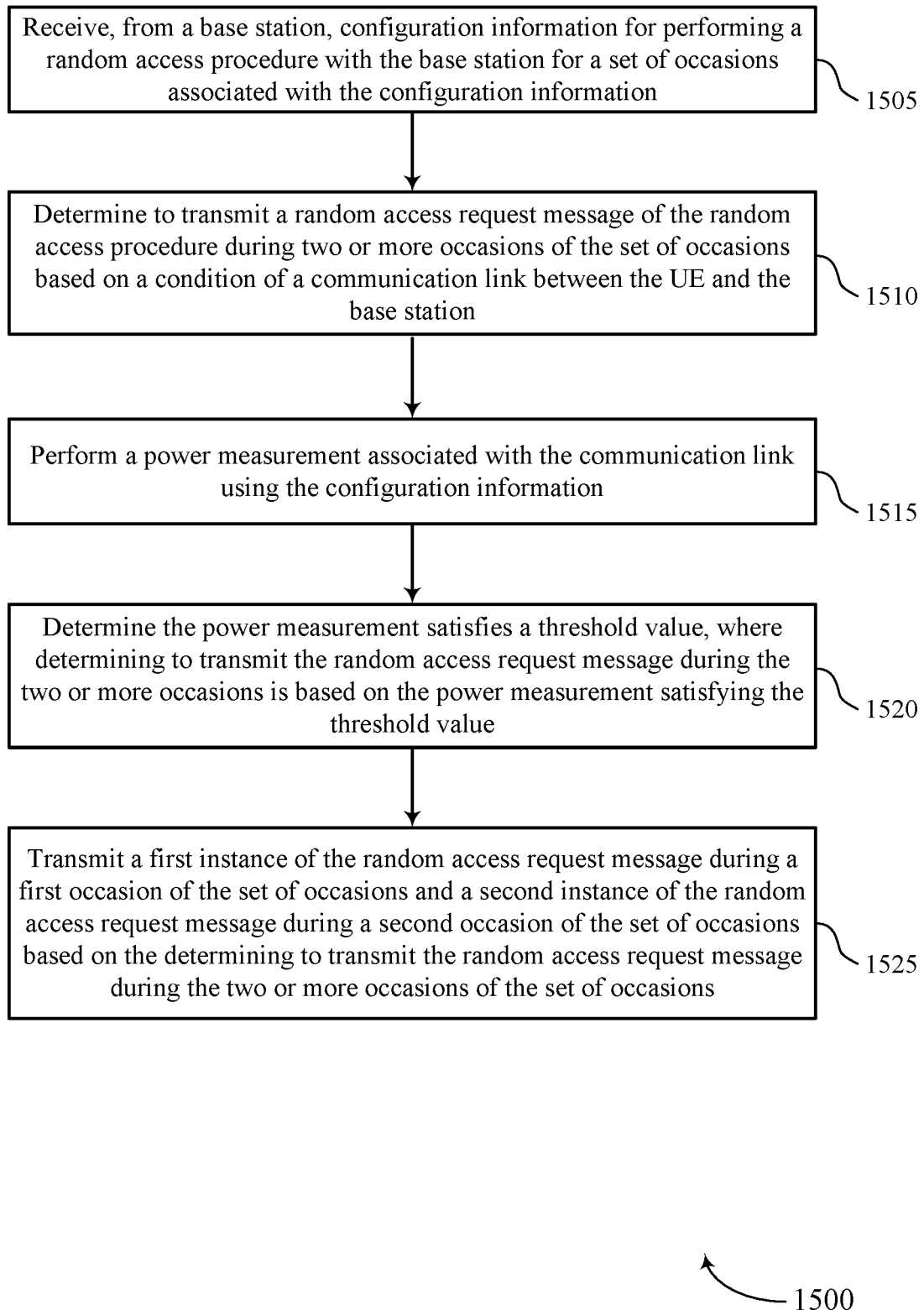

FIG. 15 shows a flowchart illustrating a method 1500 that supports repetitive random access transmissions in accordance with aspects of the present disclosure. The operations of method 1500 may be implemented by a UE 115 or its components as described herein. For example, the operations of method 1500 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, configuration information for performing a random access procedure with the base station for a set of occasions associated with the configuration information. The operations of 1505 may be performed according to the methods described herein. In some examples, aspects of the operations of 1505 may be performed by a RACH configuration component as described with reference to FIGS. 5 through 8.

At 1510, the UE may determine to transmit a random access request message of the random access procedure during two or more occasions of the set of occasions based on a condition of a communication link between the UE and the base station. The operations of 1510 may be performed according to the methods described herein. In some examples, aspects of the operations of 1510 may be performed by a RACH repetition determination component as described with reference to FIGS. 5 through 8.

At 1515, the UE may perform a power measurement associated with the communication link using the configuration information. The operations of 1515 may be performed according to the methods described herein. In some examples, aspects of the operations of 1515 may be performed by a RACH repetition determination component as described with reference to FIGS. 5 through 8.

At 1520, the UE may determine the power measurement satisfies a threshold value, where determining to transmit the random access request message during the two or more occasions is based on the power measurement satisfying the threshold value. The operations of 1520 may be performed according to the methods described herein. In some examples, aspects of the operations of 1520 may be performed by a RACH repetition determination component as described with reference to FIGS. 5 through 8.

At 1525, the UE may transmit a first instance of the random access request message during a first occasion of the set of occasions and a second instance of the random access request message during a second occasion of the set of occasions based on the determining to transmit the random access request message during the two or more occasions of the set of occasions. The operations of 1525 may be performed according to the methods described herein. In some examples, aspects of the operations of 1525 may be performed by a RACH request component as described with reference to FIGS. 5 through 8.

Figure 16:
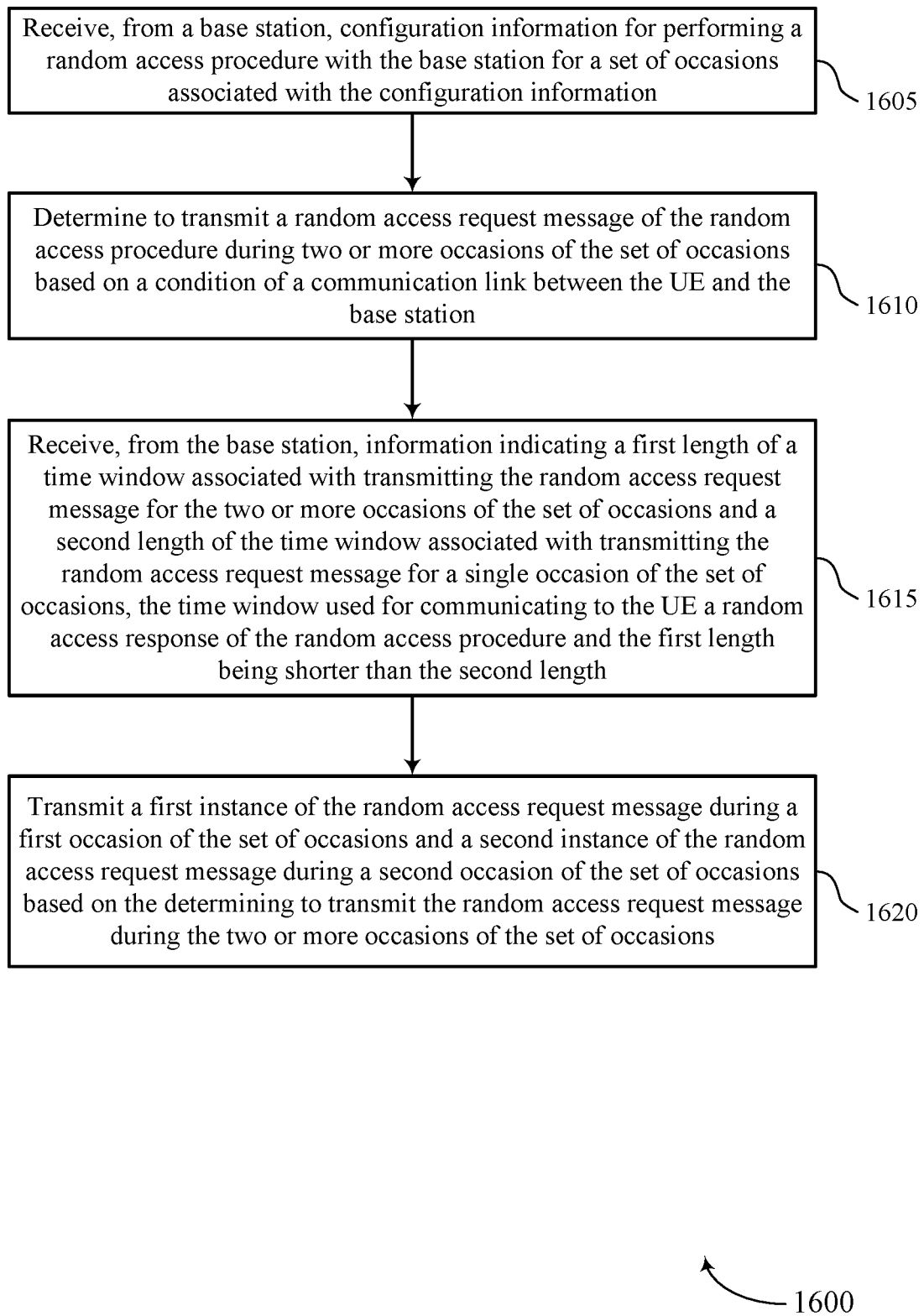

FIG. 16 shows a flowchart illustrating a method 1600 that supports repetitive random access transmissions in accordance with aspects of the present disclosure. The operations of method 1600 may be implemented by a UE 115 or its components as described herein. For example, the operations of method 1600 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, configuration information for performing a random access procedure with the base station for a set of occasions associated with the configuration information. The operations of 1605 may be performed according to the methods described herein. In some examples, aspects of the operations of 1605 may be performed by a RACH configuration component as described with reference to FIGS. 5 through 8.

At 1610, the UE may determine to transmit a random access request message of the random access procedure during two or more occasions of the set of occasions based on a condition of a communication link between the UE and the base station. The operations of 1610 may be performed according to the methods described herein. In some examples, aspects of the operations of 1610 may be performed by a RACH repetition determination component as described with reference to FIGS. 5 through 8.

At 1615, the UE may receive, from the base station, information indicating a first length of a time window associated with transmitting the random access request message for the two or more occasions of the set of occasions and a second length of the time window associated with transmitting the random access request message for a single occasion of the set of occasions, the time window used for communicating to the UE a RAR of the random access procedure and the first length being shorter than the second length. The operations of 1615 may be performed according to the methods described herein. In some examples, aspects of the operations of 1615 may be performed by a RAR window length component as described with reference to FIGS. 5 through 8.

At 1620, the UE may transmit a first instance of the random access request message during a first occasion of the set of occasions and a second instance of the random access request message during a second occasion of the set of occasions based on the determining to transmit the random access request message during the two or more occasions of the set of occasions. The operations of 1620 may be performed according to the methods described herein. In some examples, aspects of the operations of 1620 may be performed by a RACH request component as described with reference to FIGS. 5 through 8.

Figure 17:
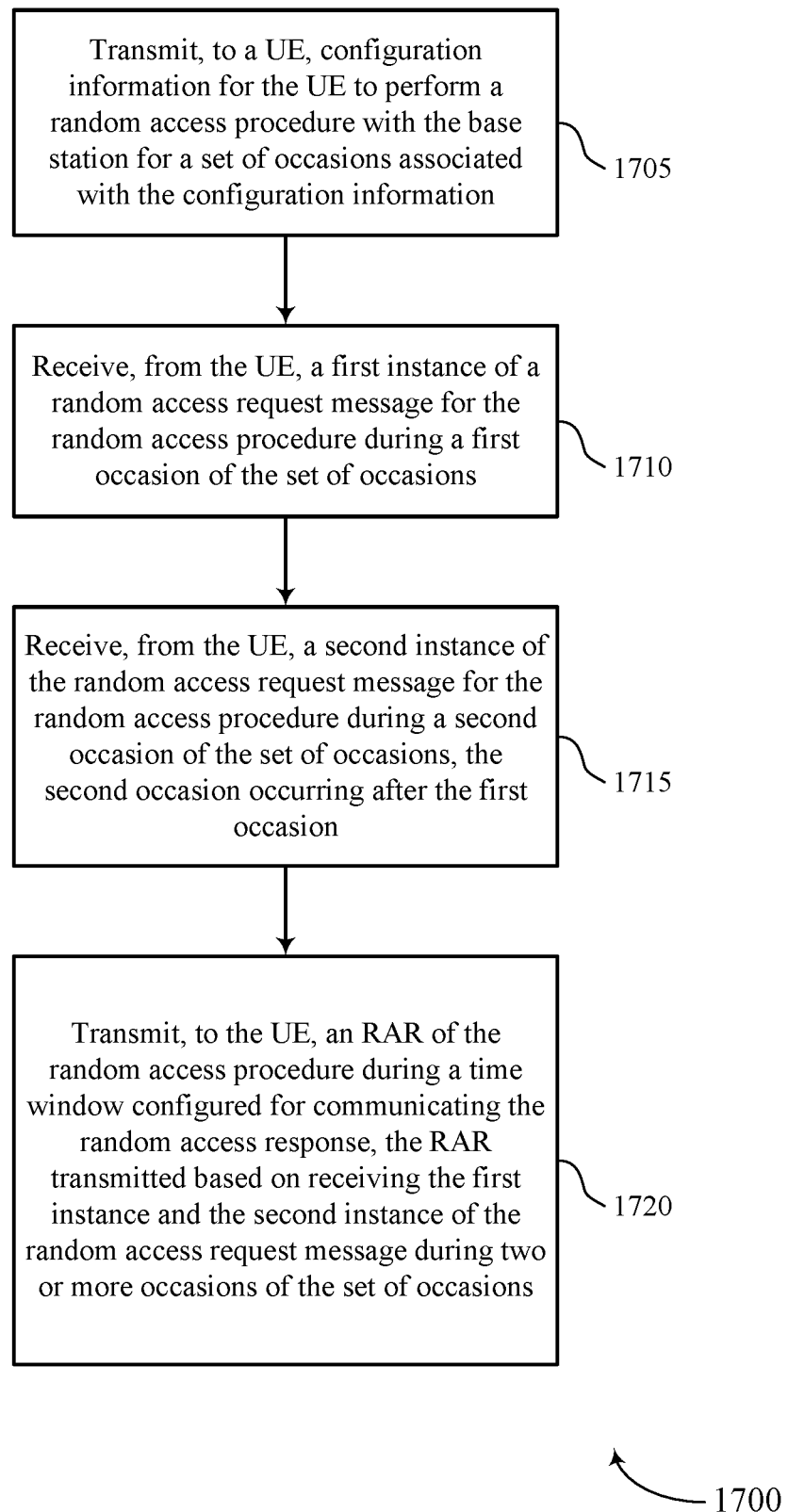

FIG. 17 shows a flowchart illustrating a method 1700 that supports repetitive random access transmissions in accordance with aspects of the present disclosure. The operations of method 1700 may be implemented by a base station 105 or its components as described herein. For example, the operations of method 1700 may be performed by a base station communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may transmit, to a UE, configuration information for the UE to perform a random access procedure with the base station for a set of occasions associated with the configuration information. The operations of 1705 may be performed according to the methods described herein. In some examples, aspects of the operations of 1705 may be performed by a RACH configuration indicator as described with reference to FIGS. 9 through 12.

At 1710, the base station may receive, from the UE, a first instance of a random access request message for the random access procedure during a first occasion of the set of occasions. The operations of 1710 may be performed according to the methods described herein. In some examples, aspects of the operations of 1710 may be performed by a RACH request instance component as described with reference to FIGS. 9 through 12.

At 1715, the base station may receive, from the UE, a second instance of the random access request message for the random access procedure during a second occasion of the set of occasions, the second occasion occurring after the first occasion. The operations of 1715 may be performed according to the methods described herein. In some examples, aspects of the operations of 1715 may be performed by an additional RACH request instance component as described with reference to FIGS. 9 through 12.

At 1720, the base station may transmit, to the UE, a RAR of the random access procedure during a time window configured for communicating the RAR, the RAR transmitted based on receiving the first instance and the second instance of the random access request message during two or more occasions of the set of occasions. The operations of 1720 may be performed according to the methods described herein. In some examples, aspects of the operations of 1720 may be performed by a RAR component as described with reference to FIGS. 9 through 12.

Figure 18:
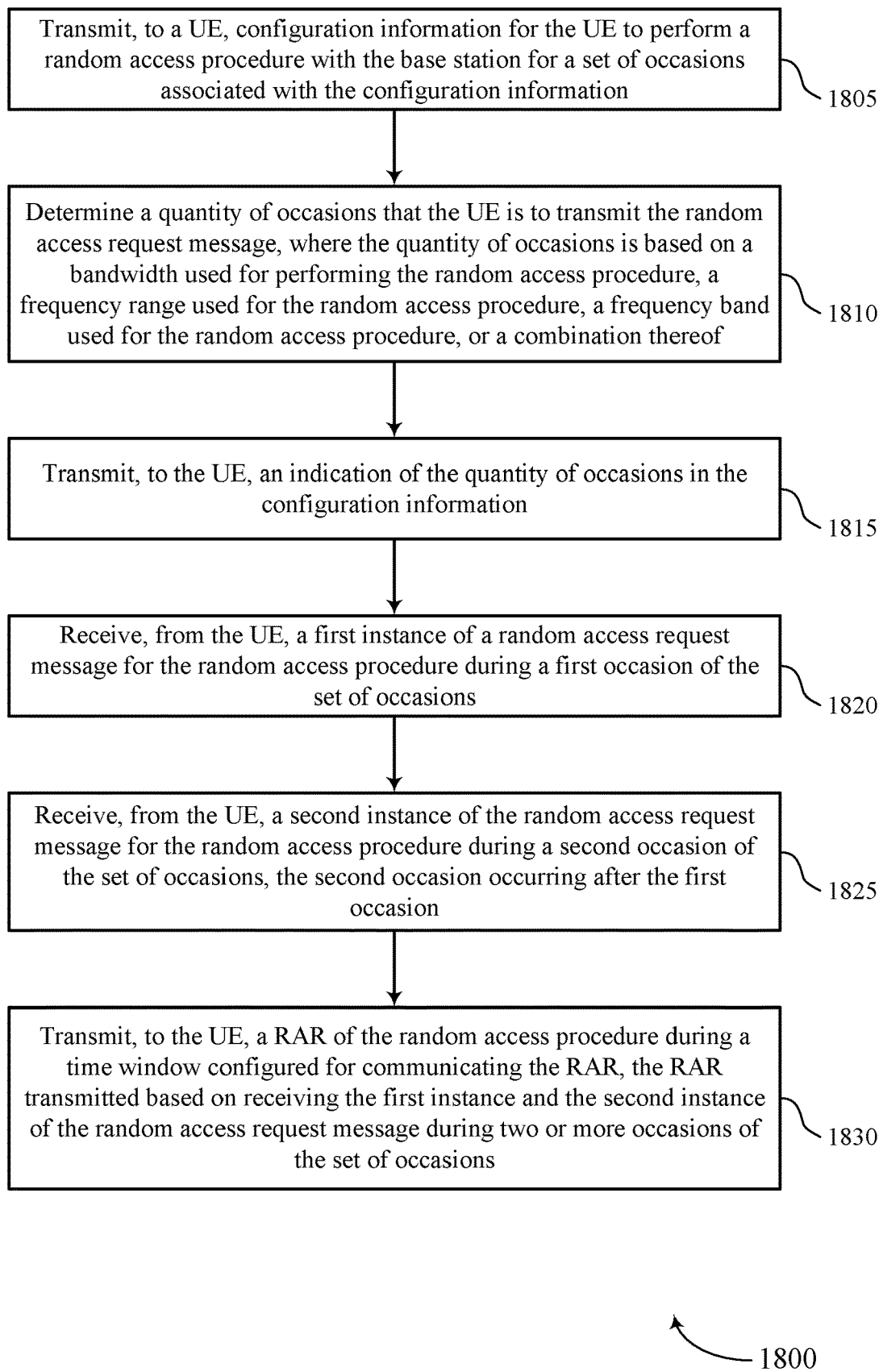

FIG. 18 shows a flowchart illustrating a method 1800 that supports repetitive random access transmissions in accordance with aspects of the present disclosure. The operations of method 1800 may be implemented by a base station 105 or its components as described herein. For example, the operations of method 1800 may be performed by a base station communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1805, the base station may transmit, to a UE, configuration information for the UE to perform a random access procedure with the base station for a set of occasions associated with the configuration information. The operations of 1805 may be performed according to the methods described herein. In some examples, aspects of the operations of 1805 may be performed by a RACH configuration indicator as described with reference to FIGS. 9 through 12.

At 1810, the base station may determine a quantity of occasions that the UE is to transmit the random access request message, where the quantity of occasions is based on a bandwidth used for performing the random access procedure, a frequency range used for the random access procedure, a frequency band used for the random access procedure, or a combination thereof. The operations of 1810 may be performed according to the methods described herein. In some examples, aspects of the operations of 1810 may be performed by a RACH request occasion quantity component as described with reference to FIGS. 9 through 12.

At 1815, the base station may transmit, to the UE, an indication of the quantity of occasions in the configuration information. The operations of 1815 may be performed according to the methods described herein. In some examples, aspects of the operations of 1815 may be performed by a RACH request occasion quantity component as described with reference to FIGS. 9 through 12.

At 1820, the base station may receive, from the UE, a first instance of a random access request message for the random access procedure during a first occasion of the set of occasions. The operations of 1820 may be performed according to the methods described herein. In some examples, aspects of the operations of 1820 may be performed by a RACH request instance component as described with reference to FIGS. 9 through 12.

At 1825, the base station may receive, from the UE, a second instance of the random access request message for the random access procedure during a second occasion of the set of occasions, the second occasion occurring after the first occasion. The operations of 1825 may be performed according to the methods described herein. In some examples, aspects of the operations of 1825 may be performed by an additional RACH request instance component as described with reference to FIGS. 9 through 12.

At 1830, the base station may transmit, to the UE, a RAR of the random access procedure during a time window configured for communicating the RAR, the RAR transmitted based on receiving the first instance and the second instance of the random access request message during two or more occasions of the set of occasions. The operations of 1830 may be performed according to the methods described herein. In some examples, aspects of the operations of 1830 may be performed by a RAR component as described with reference to FIGS. 9 through 12.

Figure 19:
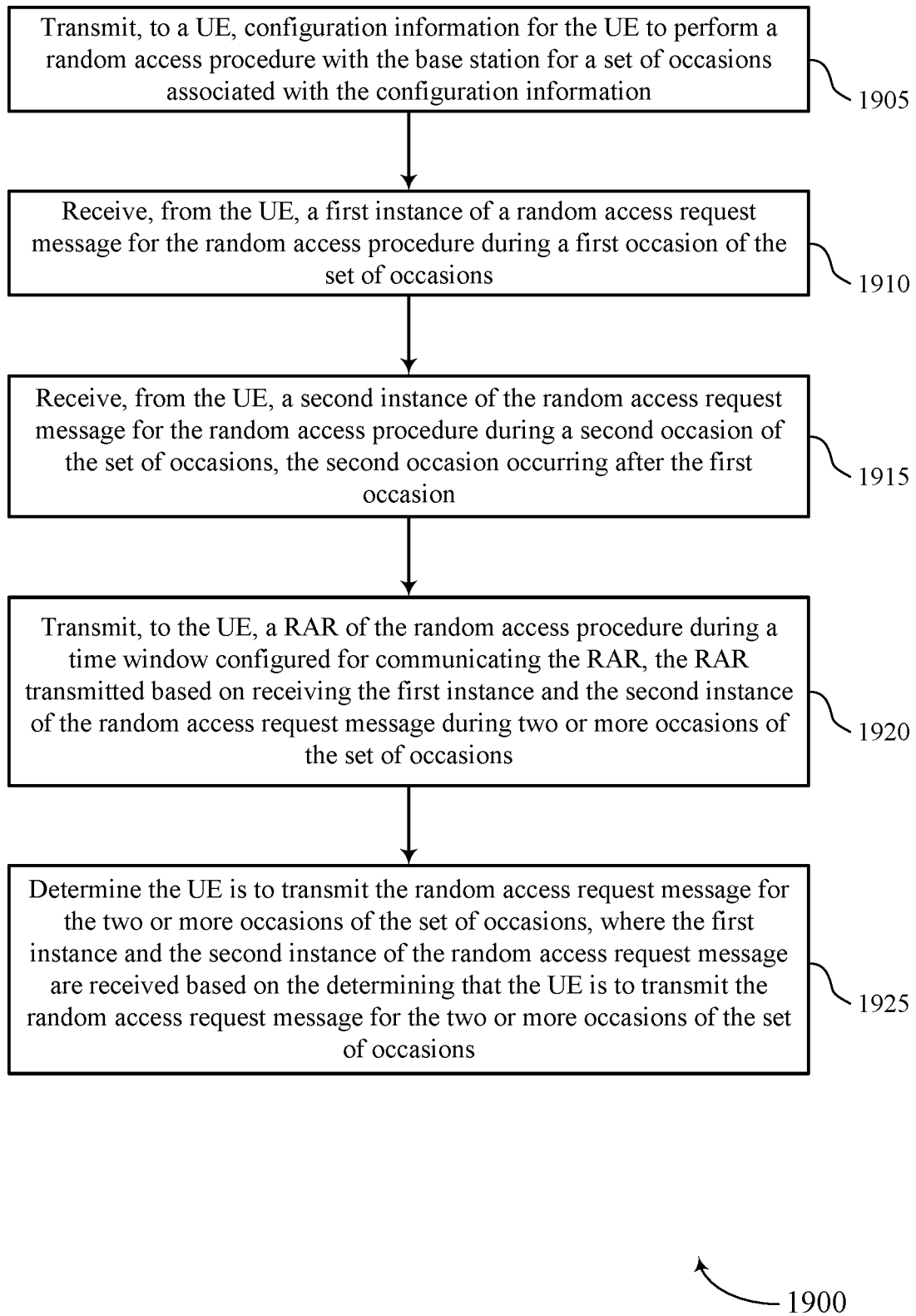

FIG. 19 shows a flowchart illustrating a method 1900 that supports repetitive random access transmissions in accordance with aspects of the present disclosure. The operations of method 1900 may be implemented by a base station 105 or its components as described herein. For example, the operations of method 1900 may be performed by a base station communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1905, the base station may transmit, to a UE, configuration information for the UE to perform a random access procedure with the base station for a set of occasions associated with the configuration information. The operations of 1905 may be performed according to the methods described herein. In some examples, aspects of the operations of 1905 may be performed by a RACH configuration indicator as described with reference to FIGS. 9 through 12.

At 1910, the base station may receive, from the UE, a first instance of a random access request message for the random access procedure during a first occasion of the set of occasions. The operations of 1910 may be performed according to the methods described herein. In some examples, aspects of the operations of 1910 may be performed by a RACH request instance component as described with reference to FIGS. 9 through 12.

At 1915, the base station may receive, from the UE, a second instance of the random access request message for the random access procedure during a second occasion of the set of occasions, the second occasion occurring after the first occasion. The operations of 1915 may be performed according to the methods described herein. In some examples, aspects of the operations of 1915 may be performed by an additional RACH request instance component as described with reference to FIGS. 9 through 12.

At 1920, the base station may transmit, to the UE, a RAR of the random access procedure during a time window configured for communicating the RAR, the RAR transmitted based on receiving the first instance and the second instance of the random access request message during two or more occasions of the set of occasions. The operations of 1920 may be performed according to the methods described herein. In some examples, aspects of the operations of 1920 may be performed by a RAR component as described with reference to FIGS. 9 through 12.

At 1925, the base station may determine the UE is to transmit the random access request message for the two or more occasions of the set of occasions, where the first instance and the second instance of the random access request message are received based on the determining that the UE is to transmit the random access request message for the two or more occasions of the set of occasions. The operations of 1925 may be performed according to the methods described herein. In some examples, aspects of the operations of 1925 may be performed by an additional RACH request instance component as described with reference to FIGS. 9 through 12.

The following provides an overview of aspects of the present disclosure:

Aspect 1: A method for wireless communications at a UE, comprising: receiving, from a base station, configuration information for performing a random access procedure with the base station for a plurality of occasions associated with the configuration information; determining to transmit a random access request message of the random access procedure during two or more occasions of the plurality of occasions based at least in part on a condition of a communication link between the UE and the base station; and transmitting a first instance of the random access request message during a first occasion of the plurality of occasions and a second instance of the random access request message during a second occasion of the plurality of occasions based at least in part on the determining to transmit the random access request message during the two or more occasions of the plurality of occasions.

Aspect 2: The method of aspect 1, further comprising: receiving, from the base station, information indicating a subset of random access preambles associated with transmitting the random access request message for the two or more occasions of the plurality of occasions, the subset of random access preambles indicated from a set of random access preambles available for the random access procedure, wherein the determining to transmit the random access request message during the two or more occasions is based at least in part on receiving the information.

Aspect 3: The method of aspect 2, further comprising: selecting a random access preamble from the subset of random access preambles, wherein transmitting the first instance and the second instance of the random access request message during the first occasion and the second occasion includes transmitting the random access preamble.

Aspect 4: The method of aspect 3, wherein a different cyclic shift is applied to the random access preamble for each instance that the random access request message is transmitted.

Aspect 5: The method of aspect 2, further comprising: selecting a first random access preamble from the subset of random access preambles for the first occasion, wherein transmitting the first instance of the random access request message during the first occasion includes transmitting the first random access preamble; and selecting a second random access preamble from the subset of random access preambles for the second occasion, wherein transmitting the second instance of the random access request message during the second occasion includes transmitting the second random access preamble.

Aspect 6: The method of any of aspects 1 through 5, further comprising: performing a power measurement associated with the communication link using the configuration information; and determining the power measurement satisfies a threshold value, wherein determining to transmit the random access request message during the two or more occasions is based at least in part on the power measurement satisfying the threshold value.

Aspect 7: The method of aspect 6, wherein the power measurement comprises a reference signal received power measurement, a received signal strength indication measurement, or a combination thereof.

Aspect 8: The method of any of aspects 1 through 7, further comprising: identifying an exposure condition of the UE, wherein the determining to transmit the random access request message during the two or more occasions is based at least in part on the exposure condition of the UE.

Aspect 9: The method of any of aspects 1 through 8, further comprising: receiving, from the base station, information indicating a first length of a time window associated with transmitting the random access request message for the two or more occasions of the plurality of occasions and a second length of the time window associated with transmitting the random access request message for a single occasion of the plurality of occasions, the time window used for communicating to the UE a random access response of the random access procedure and the first length being shorter than the second length.

Aspect 10: The method of aspect 9, wherein the first instance of the random access request message is transmitted before a first time window having the first length and the second instance of the random access request message is transmitted after the first time window associated with the first instance expires according to the first length.

Aspect 11: The method of any of aspects 9 through 10, further comprising: monitoring for the random access response of the random access procedure after a last instance of the random access request message is transmitted, wherein the random access response is monitored during the time window according to the first length.

Aspect 12: The method of any of aspects 9 through 11, further comprising: determining the first length of the time window and the second length of the time window based at least in part on a single bitfield in the information, a table of time window lengths, or a combination thereof.

Aspect 13: The method of any of aspects 9 through 12, wherein the first length of the time window is based at least in part on the second length of the time window, a frequency range used for the random access procedure, a frequency band used for the random access procedure, or a combination thereof.

Aspect 14: The method of any of aspects 1 through 13, further comprising: determining a quantity of occasions for the plurality of occasions to transmit the random access request message based at least in part on the configuration information, wherein determining to transmit the random access request message during the two or more occasions is based at least in part on determining the quantity of occasions.

Aspect 15: The method of aspect 14, wherein the quantity of occasions to transmit the random access request message is based at least in part on a bandwidth used for performing the random access procedure, a frequency range used for the random access procedure, a frequency spectrum band used for the random access procedure, or a combination thereof.

Aspect 16: The method of any of aspects 1 through 15, wherein the configuration information is received via a synchronization signal block, a system information block, system information, or a combination thereof.

Aspect 17: The method of any of aspects 1 through 16, wherein the plurality of occasions occur between receiving a first synchronization signal block carrying the configuration information and receiving a second synchronization signal block carrying additional configuration information.

Aspect 18: A method for wireless communications at a base station, comprising: transmitting, to a UE, configuration information for the UE to perform a random access procedure with the base station for a plurality of occasions associated with the configuration information; receiving, from the UE, a first instance of a random access request message for the random access procedure during a first occasion of the plurality of occasions; receiving, from the UE, a second instance of the random access request message for the random access procedure during a second occasion of the plurality of occasions, the second occasion occurring after the first occasion; and transmitting, to the UE, a random access response of the random access procedure during a time window configured for communicating the random access response, the random access response transmitted based at least in part on receiving the first instance and the second instance of the random access request message during two or more occasions of the plurality of occasions.

Aspect 19: The method of aspect 18, further comprising: transmitting, to the UE, information indicating a subset of random access preambles associated with the UE transmitting the random access request message for the two or more occasions of the plurality of occasions, the subset of random access preambles indicated from a set of random access preambles available for the random access procedure.

Aspect 20: The method of aspect 19, wherein the first instance and the second instance of the random access request message are received with a same random access preamble or different random access preambles.

Aspect 21: The method of any of aspects 19 through 20, wherein the first instance of the random access request message is received with a random access preamble with a first cyclic shift applied, and the second instance of the random access request message is received with the random access preamble with a second cyclic shift applied.

Aspect 22: The method of any of aspects 18 through 21, further comprising: transmitting, to the UE, information indicating a first length of the time window associated with the UE transmitting the random access request message for the two or more occasions of the plurality of occasions and a second length of the time window associated with the UE transmitting the random access request message for a single occasion of the plurality of occasions, the first length being shorter than the second length.

Aspect 23: The method of aspect 22, further comprising: determining the first length of the time window based at least in part on the second length of the time window, a frequency range used for the random access procedure, a frequency band used for the random access procedure, or a combination thereof.

Aspect 24: The method of any of aspects 22 through 23, wherein the first length of the time window and the second length of the time window are indicated based at least in part on a single bitfield in the signaling, a table of time window lengths, or a combination thereof.

Aspect 25: The method of any of aspects 22 through 24, wherein the second instance of the random access request message is received after the first instance of the random access request message according to the first length.

Aspect 26: The method of any of aspects 18 through 25, further comprising: determining a quantity of occasions that the UE is to transmit the random access request message, wherein the quantity of occasions is based at least in part on a bandwidth used for performing the random access procedure, a frequency range used for the random access procedure, a frequency band used for the random access procedure, or a combination thereof; and transmitting, to the UE, an indication of the quantity of occasions in the configuration information.

Aspect 27: The method of any of aspects 18 through 26, further comprising: determining the UE is to transmit the random access request message for the two or more occasions of the plurality of occasions, wherein the first instance and the second instance of the random access request message are received based at least in part on the determining that the UE is to transmit the random access request message for the two or more occasions of the plurality of occasions.

Aspect 28: The method of aspect 27, wherein the determining that the UE is to transmit the random access request message for the two or more occasions of the plurality of occasions is based at least in part on a power measurement, an exposure condition of the UE, or a combination thereof.

Aspect 29: The method of any of aspects 18 through 28, further comprising: selecting a first beam to receive the first instance of the random access request message; and selecting a second beam to receive the second instance of the random access request message, the second beam being different than the first beam.

Aspect 30: The method of aspect 29, wherein the first beam and the second beam differ based at least in part on a beam refinement procedure.

Aspect 31: The method of any of aspects 18 through 30, wherein the configuration information is transmitted via a synchronization signal block, a system information block, system information, or a combination thereof.

Aspect 32: The method of any of aspects 18 through 31, wherein the plurality of occasions occur between transmitting a first synchronization signal block carrying the configuration information and transmitting a second synchronization signal block carrying additional configuration information.

Aspect 33: An apparatus for wireless communications at a UE, comprising a processor; memory coupled with the processor; and instructions stored in the memory and executable by the processor to cause the apparatus to perform a method of any of aspects 1 through 17.

Aspect 34: An apparatus for wireless communications at a UE, comprising at least one means for performing a method of any of aspects 1 through 17.

Aspect 35: A non-transitory computer-readable medium storing code for wireless communications at a UE, the code comprising instructions executable by a processor to perform a method of any of aspects 1 through 17.

Aspect 36: An apparatus for wireless communications at a base station, comprising a processor; memory coupled with the processor; and instructions stored in the memory and executable by the processor to cause the apparatus to perform a method of any of aspects 18 through 32.

Aspect 37: An apparatus for wireless communications at a base station, comprising at least one means for performing a method of any of aspects 18 through 32.

Aspect 38: A non-transitory computer-readable medium storing code for wireless communications at a base station, the code comprising instructions executable by a processor to perform a method of any of aspects 18 through 32.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    receiving, from a base station, configuration information for performing a random access procedure with the base station for a plurality of occasions associated with the configuration information, the configuration information indicating a first length of a time window and a second length of the time window, wherein the time window is for communicating a random access response associated with a transmission of a random access request message of the random access procedure, and wherein the first length is shorter than the second length;
    determining to transmit two or more instances of the random access request message of the random access procedure during two or more occasions of the plurality of occasions based at least in part on a condition of a communication link between the UE and the base station; and
    performing the random access procedure, wherein performing the random access procedure comprises transmitting a first instance of the random access request message during a first occasion of the plurality of occasions and a second instance of the random access request message during a second occasion of the plurality of occasions based at least in part on the determining to transmit the two or more instances of the random access request message during the two or more occasions of the plurality of occasions and in accordance with the configuration information indicating the first length and the second length.

2. The method of claim 1, further comprising:
    receiving, from the base station, information indicating a subset of random access preambles, the subset of random access preambles indicated from a set of random access preambles available for the random access procedure, wherein the determining to transmit the random access request message during the two or more occasions is based at least in part on receiving the information.

3. The method of claim 2, further comprising:
    selecting a random access preamble from the subset of random access preambles, wherein performing the random access procedure further comprises transmitting the random access preamble.

4. The method of claim 3, wherein a different cyclic shift is applied to the random access preamble for each instance of the random access request message that is transmitted.

5. The method of claim 2, further comprising:
    selecting a first random access preamble from the subset of random access preambles for the first occasion, wherein transmitting the first instance of the random access request message during the first occasion includes transmitting the first random access preamble; and selecting a second random access preamble from the subset of random access preambles for the second occasion, wherein transmitting the second instance of the random access request message during the second occasion includes transmitting the second random access preamble.

6. The method of claim 1, further comprising:
performing a power measurement associated with the communication link using the configuration information; and
determining the power measurement satisfies a threshold value, wherein the determining to transmit the random access request message during the two or more occasions is based at least in part on the power measurement satisfying the threshold value.

7. The method of claim 6, wherein the power measurement comprises a reference signal received power measurement, a received signal strength indication measurement, or a combination thereof.

8. The method of claim 1, further comprising:
identifying an exposure condition of the UE, wherein the determining to transmit the random access request message during the two or more occasions is based at least in part on the exposure condition of the UE.

9. The method of claim 1,
wherein the first length of the time window for communicating the random access response is associated with the transmission of the random access request message for the two or more occasions of the plurality of occasions and the second length of the time window for communicating the random access response is associated with the transmission of the random access request message for a single occasion of the plurality of occasions.

10. The method of claim 9, wherein the first instance of the random access request message is transmitted before a first time window having the first length and the second instance of the random access request message is transmitted after the first time window associated with the first instance expires according to the first length.

11. The method of claim 9, further comprising:
monitoring for the random access response of the random access procedure after a last instance of the random access request message is transmitted, wherein the random access response is monitored during the time window according to the first length.

12. The method of claim 9, further comprising:
determining the first length of the time window and the second length of the time window based at least in part on a single bitfield in the configuration information, a table of time window lengths, or a combination thereof.

13. The method of claim 9, wherein the first length of the time window is based at least in part on a frequency range used for the random access procedure, a frequency band used for the random access procedure, or a combination thereof.

14. The method of claim 1, further comprising:
determining a quantity of occasions for the plurality of occasions to transmit the random access request message based at least in part on the configuration information, wherein the determining to transmit the random access request message during the two or more occasions is based at least in part on determining the quantity of occasions.

15. The method of claim 14, wherein the quantity of occasions to transmit the random access request message is based at least in part on a bandwidth used for performing the random access procedure, a frequency range used for the random access procedure, a frequency spectrum band used for the random access procedure, or a combination thereof.

16. The method of claim 1, wherein the configuration information is received via a synchronization signal block, a system information block, system information, or a combination thereof.

17. The method of claim 1, wherein the plurality of occasions occur between receiving a first synchronization signal block carrying the configuration information and receiving a second synchronization signal block carrying additional configuration information.

18. A method for wireless communications at a base station, comprising:
transmitting, to a user equipment (UE), configuration information for the UE to perform a random access procedure with the base station for a plurality of occasions associated with the configuration information, the configuration information indicating a first length of a time window and a second length of the time window, wherein the time window is for communicating a random access response associated with a reception of a random access request message of the random access procedure, and wherein the first length is shorter than the second length;
receiving, from the UE, a first instance of the random access request message for the random access procedure during a first occasion of the plurality of occasions and in accordance with the configuration information indicating the first length and the second length;
receiving, from the UE, a second instance of the random access request message for the random access procedure during a second occasion of the plurality of occasions and in accordance with the configuration information indicating the first length and the second length, the second occasion occurring after the first occasion; and
transmitting, to the UE, the random access response of the random access procedure during the time window configured for communicating the random access response, the random access response transmitted based at least in part on receiving the first instance and the second instance of the random access request message during two or more occasions of the plurality of occasions.

19. The method of claim 18, further comprising:
transmitting, to the UE, information indicating a subset of random access preambles, the subset of random access preambles indicated from a set of random access preambles available for the random access procedure, wherein the receiving the first instance and the second instance of the random access request message during the two or more occasions is based at least in part on transmitting the information.

20. The method of claim 19, wherein the first instance and the second instance of the random access request message are received with a same random access preamble or different random access preambles.

21. The method of claim 19, wherein the first instance of the random access request message is received with a random access preamble with a first cyclic shift applied, and the second instance of the random access request message is received with the random access preamble with a second cyclic shift applied.

22. The method of claim 18,
wherein the first length of the time window for transmitting the random access response is associated with communication of the random access request message for the two or more occasions of the plurality of occasions and the second length of the time window for transmitting the random access response is associated with communication of the random access request message for a single occasion of the plurality of occasions, the first length being shorter than the second length.

23. The method of claim 22, further comprising:
determining the first length of the time window based at least in part on a frequency range used for the random access procedure, a frequency band used for the random access procedure, or a combination thereof.

24. The method of claim 22, wherein the first length of the time window and the second length of the time window are indicated based at least in part on a single bitfield in the random access response, a table of time window lengths, or a combination thereof.

25. The method of claim 22, wherein the second instance of the random access request message is received after the first instance of the random access request message according to the first length.

26. The method of claim 18, further comprising:
determining a quantity of occasions that the UE is to transmit the random access request message, wherein the quantity of occasions is based at least in part on a bandwidth used for performing the random access procedure, a frequency range used for the random access procedure, a frequency band used for the random access procedure, or a combination thereof; and
transmitting, to the UE, an indication of the quantity of occasions in the configuration information.

27. The method of claim 18, further comprising:
determining the UE is to transmit the random access request message for the two or more occasions of the plurality of occasions, wherein the first instance and the second instance of the random access request message are received based at least in part on the determining.

28. The method of claim 18, further comprising:
selecting a first beam to receive the first instance of the random access request message; and
selecting a second beam to receive the second instance of the random access request message, the second beam being different than the first beam.

29. An apparatus for wireless communications at a user equipment (UE), comprising:
a processor;
memory coupled with the processor; and
instructions stored in the memory and operable, when executed by the processor, to cause the apparatus to:
receive, from a base station, configuration information for performing a random access procedure with the base station for a plurality of occasions associated with the configuration information, the configuration information indicating a first length of a time window and a second length of the time window, wherein the time window is for communicating a random access response associated with a transmission of a random access request message of the random access procedure, and wherein the first length is based on the second length and the first length is shorter than the second length;
determine to transmit two or more instances of the random access request message of the random access procedure during two or more occasions of the plurality of occasions based at least in part on a condition of a communication link between the UE and the base station; and
perform the random access procedure, wherein performing the random access procedure comprises transmit a first instance of the random access request message during a first occasion of the plurality of occasions and a second instance of the random access request message during a second occasion of the plurality of occasions based at least in part on the determining to transmit the two or more instances of the random access request message during the two or more occasions of the plurality of occasions and in accordance with the configuration information indicating the first length and the second length.

30. An apparatus for wireless communications at a base station, comprising:
a processor;
memory coupled with the processor; and
instructions stored in the memory and operable, when executed by the processor, to cause the apparatus to:
transmit, to a user equipment (UE), configuration information for the UE to perform a random access procedure with the base station for a plurality of occasions associated with the configuration information, the configuration information indicating a first length of a time window and a second length of the time window, wherein the time window is for communicating a random access response associated with a reception of a random access request message of the random access procedure, and wherein the first length is shorter than the second length;
receive, from the UE, a first instance of the random access request message for the random access procedure during a first occasion of the plurality of occasions and in accordance with the configuration information indicating the first length and the second length;
receive, from the UE, a second instance of the random access request message for the random access procedure during a second occasion of the plurality of occasions and in accordance with the configuration information indicating the first length and the second length, the second occasion occurring after the first occasion; and
transmit, to the UE, the random access response of the random access procedure during the time window configured for communicating the random access response, the random access response transmitted based at least in part on receiving the first instance and the second instance of the random access request message during two or more occasions of the plurality of occasions.

* * * * *